US 10,167,908 B2

(12) United States Patent
Mizuno et al.

(10) Patent No.: US 10,167,908 B2
(45) Date of Patent: Jan. 1, 2019

(54) CLUTCH ACTUATOR STRUCTURE

(75) Inventors: Kinya Mizuno, Tokyo (JP); Yoshiaki Tsukada, Tokyo (JP); Takashi Ozeki, Tokyo (JP); Kazuhiro Takeuchi, Tokyo (JP); Yasushi Fujimoto, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 1226 days.

(21) Appl. No.: 12/720,925

(22) Filed: Mar. 10, 2010

(65) Prior Publication Data
US 2010/0243396 A1 Sep. 30, 2010

(30) Foreign Application Priority Data

Mar. 31, 2009 (JP) ................................. 2009-086482
Nov. 27, 2009 (JP) ................................. 2009-269500

(51) Int. Cl.
*F16D 48/04* (2006.01)
*F16D 48/02* (2006.01)
*F16D 25/0638* (2006.01)

(52) U.S. Cl.
CPC ......... *F16D 48/04* (2013.01); *F16D 48/0206* (2013.01); *F16D 25/0638* (2013.01); *F16D 2048/0218* (2013.01); *F16D 2500/1026* (2013.01); *F16D 2500/1117* (2013.01); *F16D 2500/70406* (2013.01)

(58) Field of Classification Search
CPC ..... F16D 2048/0218; F16D 2500/1117; F16D 48/0206; F16D 2048/0224; F16D 2048/0269; F16D 48/04; F16D 2500/1026; F16D 2500/70406

USPC ............... 74/606 A; 192/85.63, 112, 48.614, 192/48.611, 48.609; 180/346, 291, 292, 180/228, 219, 337; 137/635.65, 625.2, 137/625.25
See application file for complete search history.

(56) References Cited

U.S. PATENT DOCUMENTS

| 4,290,513 | A | * | 9/1981 | Nishimura et al. ........... 192/3.22 |
| 4,673,190 | A | * | 6/1987 | Ahlberg ................... B62J 27/00 180/219 |
| 5,058,455 | A | * | 10/1991 | Nemoto et al. ............. 74/606 R |
| 5,669,479 | A | * | 9/1997 | Matsufuji .................. 192/85.63 |

(Continued)

FOREIGN PATENT DOCUMENTS

| DE | 1 480 417 A1 | 4/1969 |
| JP | 5-263961 A | 10/1993 |

(Continued)

*Primary Examiner* — Mark A Manley
(74) *Attorney, Agent, or Firm* — Westerman, Hattori, Daniels & Adrian, LLP

(57) ABSTRACT

A clutch actuator structure provided for an internal combustion engine and a hydraulic clutch mechanism for transmitting a rotational driving force of a crankshaft of said engine includes a clutch actuator for controlling an oil pressure for engaging and disengaging the hydraulic clutch mechanism. The clutch actuator structure ensures that noises generated at the times of operation of the clutch actuator for actuating a hydraulic clutch are prevented from being transmitted to the exterior. The clutch actuator structure includes an oil sump part for reserving oil provided in the periphery of a clutch actuator. The clutch actuator is disposed in the oil sump part.

10 Claims, 19 Drawing Sheets

(56) References Cited

U.S. PATENT DOCUMENTS

| | | | |
|---|---|---|---|
| 7,066,206 B2* | 6/2006 | Ino et al. | 137/625.65 |
| 2006/0260873 A1* | 11/2006 | Suzuki | F01M 1/02 184/6.5 |
| 2008/0053775 A1 | 3/2008 | Tsukada et al. | |
| 2008/0128239 A1 | 6/2008 | Ogasawara | |
| 2009/0107750 A1* | 4/2009 | Maehara | F01L 1/022 180/219 |
| 2010/0025180 A1* | 2/2010 | Kanno et al. | 192/87.11 |

FOREIGN PATENT DOCUMENTS

| | | |
|---|---|---|
| JP | 2000-104761 A | 4/2000 |
| JP | 2008-57620 A | 3/2008 |
| JP | 2008-89067 A | 4/2008 |
| JP | 2008-138541 A | 6/2008 |
| WO | WO 2008038738 A1 * | 4/2008 |

* cited by examiner

CLUTCH ACTUATOR STRUCTURE

TECHNICAL FIELD

The present invention relates to a clutch actuator for actuating a hydraulic clutch of an internal combustion engine.

BACKGROUND OF THE INVENTION

Conventionally, there has been an exemplary structure in which a clutch actuator is mounted to the outside of a crankcase of an internal combustion engine. In this structure, however, during the operation of the clutch actuator, the operating sounds generated at valve opening and closing times are transmitted to the exterior, which naturally is undesirable (see, for example, FIG. 3 of Japanese Patent Laid-open No. 2008-057620).

There has been another exemplary structure in which a clutch actuator is mounted to the inside of a crankcase. Also in this structure, however, sounds are echoed onto a thin clutch cover, again leading to leakage of operating sounds to the exterior (see, for example, FIG. 6 of Japanese Patent Laid-open No. 2008-138541).

SUMMARY OF THE INVENTION

The clutch actuator structure ensures that the operating sounds generated at the time of operation of a clutch actuator for actuating a hydraulic clutch of an internal combustion engine are prevented from being transmitted to the exterior.

The first aspect of the structure pertains to a clutch actuator structure provided for an internal combustion engine and a hydraulic clutch mechanism for transmitting a rotational driving force of a crankshaft of the engine. The clutch actuator structure controls an oil pressure for engaging and disengaging the hydraulic clutch mechanism. An oil sump part for reserving the oil is provided in the periphery of the clutch actuator, and the clutch actuator is disposed in the oil sump part.

The second aspect of the structure is characterized in that the clutch actuator is mounted to the inside of the oil sump part provided in a crankcase or a crankcase cover, and a cover member is fixed so as to cover the oil sump part.

The third aspect of the structure is characterized in that the clutch mechanism includes a plurality of clutches, and a plurality of oil passages are formed to extend from the clutch actuator to the clutch mechanism substantially in parallel to each other.

The fourth aspect of the structure is characterized in that an oil discharge hole is provided in the clutch actuator and opens into the oil sump part.

The fifth aspect of the structure is characterized in that the clutch actuator includes a tubular member to which the plurality of oil passages are connected and a sliding member operating in the tubular member so as to switch between communicating conditions of the oil passages; wherein the tubular member and the sliding member are made to slide by an operation of the clutch actuator, whereby a return oil from a clutch is discharged from the discharge hole.

The sixth aspect of the structure is characterized in that a supply oil passage for supplying the oil from an oil pump to the tubular member and the sliding member is branched and extends to form a clutch lubricating oil passage.

The seventh aspect of the structure is characterized, in that the cover member includes an oil return hole above the clutch actuator.

The eighth aspect of the structure is characterized in that the clutch actuator is located on a front lower side of the clutch mechanism in side view of the internal combustion engine, and is disposed on the inside of the oil sump part provided in the crankcase cover.

The ninth aspect of the structure is characterized in that the clutch mechanism is disposed on a rear upper side of the crankshaft in side view of the internal combustion engine, and the clutch actuator is disposed on the lower side of the crankshaft in side view of the internal combustion engine.

The tenth aspect of the structure is characterized in that a main shaft coaxial with the clutch mechanism is disposed on a rear upper side of the crankshaft, an upper wall of the crankcase forms a slant surface facing toward a front upper side between the crankshaft and the main shaft, and an engine hanger is projectingly formed on the slant surface of the upper wall of the crankcase.

In the first aspect of the clutch actuator structure, the oil sump part is provided, and the clutch actuator is disposed in the oil sump part. Therefore, the valve opening and closing sounds generated during the operation of the clutch actuator can be attenuated, and the sound leaking to the exterior is reduced.

In the second aspect of the structure, the oil sump part can be formed in a simple structure.

In the third aspect of the structure, the plurality of oil passages can be formed substantially in parallel to each other. Therefore, notwithstanding that the oil passages are provided in plurality, they can be arranged efficiently. In addition, since the directions of machining can be unified, machinability can be enhanced.

In the fourth aspect of the structure, the oil discharged from the clutch actuator is reserved. Therefore, the need for other oil supply means is eliminated, and the number of component parts is reduced.

In the fifth aspect of the structure, the return oil is discharged from the discharge hole by sliding of the sliding member. Therefore, the sliding part can be lubricated utilizing the oil thus discharged.

In the sixth aspect of the structure, the supply oil passage is branched and extended to form the clutch lubricating oil passage, which is easier to carry out than the formation of a clutch lubricating oil passage communicating with other lubricating oil circuit. Accordingly, the number of machining steps is reduced.

In the seventh aspect of the structure, the oil return hole is formed above the clutch actuator by the cover member. Therefore, it is ensured that the clutch actuator is sufficiently immersed in the oil, so that surplus oil can be speedily recovered into the internal combustion engine while producing the operating sound reducing effect.

In the eighth aspect of the structure, the clutch actuator is disposed on the inside of the oil sump part provided in the crankcase cover, so that the clutch actuator projects on a lateral side of the internal combustion engine together with the clutch mechanism. However, since the clutch actuator is located on the front lower side of the clutch mechanism in side view of the internal combustion engine, a foot rest space for the rider can be secured at an optimum position on the rear side of the clutch actuator and on the lower side of the clutch mechanism.

Incidentally, since the oil sump part to which the clutch actuator is mounted is provided in the crankcase cover, a situation that the space inside the crankcase is limited to be narrower by the oil sump part can be obviated.

In the ninth aspect of the structure, the clutch mechanism is disposed on a rear upper side of the crankshaft in side view of the internal combustion engine, and the clutch actuator is disposed on the lower side of the crankshaft in side view of the internal combustion engine. Therefore, a position on the rear lower side of the crankshaft becomes a foot rest position for the rider, and the position is an optimum position as a foot rest position for the rider in the case of a motorcycle in which the internal combustion engine is horizontally mounted on a vehicle body.

In the tenth aspect of the structure, the main shaft coaxial with the clutch mechanism is disposed on a rear upper side of the crankshaft, the upper wall of the crankcase forms the slant surface facing toward a front upper side between the crankshaft and the main shaft, and the engine hanger is projectingly formed on the slant surface. Therefore, it is unnecessary to provide the engine hanger projecting upward beyond a highest part of the crankcase, so that the internal combustion engine can be mounted on the vehicle body in a compact fashion.

BRIEF DESCRIPTION OF THE DRAWINGS

The advantages of the invention will become apparent in the following description taken in conjunction with the drawings, wherein.

DETAILED DESCRIPTION OF THE INVENTION

Figure 1:
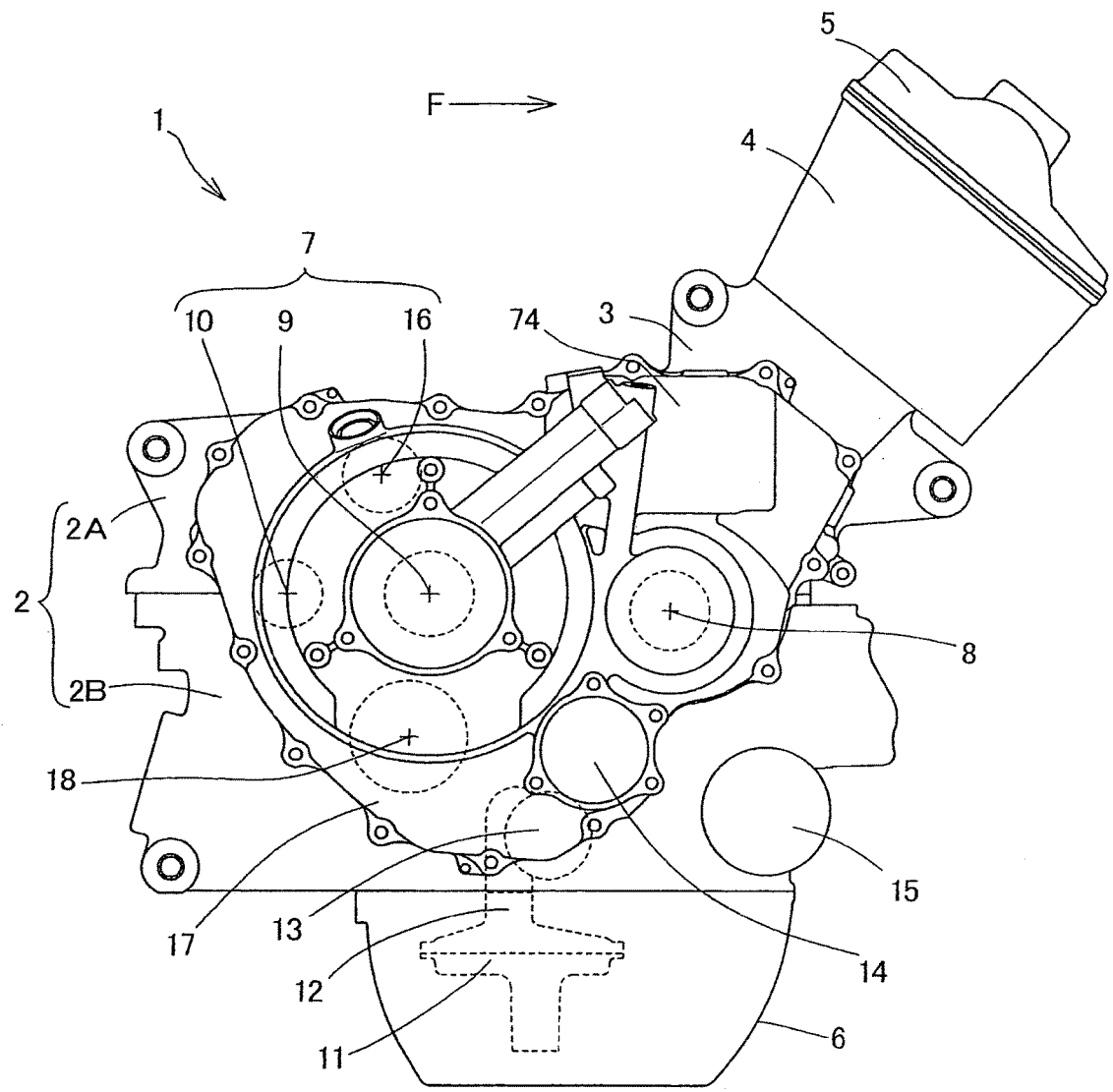
FIG. 1 is a right side view of an internal combustion engine according to an embodiment of the present invention.

FIG. 1 is a right side view of an internal combustion engine 1 according to an embodiment of the present invention. The internal combustion engine 1 is a parallel two-cylinder internal combustion engine. Arrow F indicates the front side corresponding to the front side of a vehicle on which the internal combustion engine 1 is mounted.

A main outer shell of the internal combustion engine 1 includes a crankcase 2 which is composed of an upper crankcase 2A and a lower crankcase 2B, a cylinder block 3, a cylinder head 4, a cylinder head cover 5, and an oil pan 6. A transmission 7 is integrally incorporated in the crankcase 2.

A crankshaft 8, and a main shaft 9 and a counter shaft 10 of the transmission are rotatably borne on bearings at mating surfaces of the crankcase 2 which is bisected to the upper and lower components.

The oil pan 6 connected to the lower end of the lower crankcase 2B is provided with an oil suction pipe 12 having a strainer 11, and a control oil pump 13 and a control oil filter 14 connected thereto are connected to an upper portion of the oil suction pipe 12.

The internal combustion engine 1 is provided also with a lubricating oil pump, which is omitted in the drawing.

A lubricating oil filter 15 is shown in the figure. The discharge pressure of the control oil pump 13 is set high for clutch actuator use, and the discharge pressure of the lubricating oil pump is lower than the discharge pressure of the control oil pump.

The transmission 7 accommodated in a rear portion of the crankcase 2 of the internal combustion engine 1 is a constant-mesh type twin-clutch transmission.

In addition, a change mechanism including a shift drum 16 and the like for changing the transmission gear speed is accommodated in the rear portion of the crankcase 2.

A crankcase right side portion is covered with a right crankcase cover 17. Outside portions of various oil passages are bulging in the form of folds on the outer surface of the right crankcase cover 17.

Incidentally, an output shaft 18 for driving the vehicle by obtaining power from the counter shaft 10 is provided below the crankshaft 8.

Figure 2:
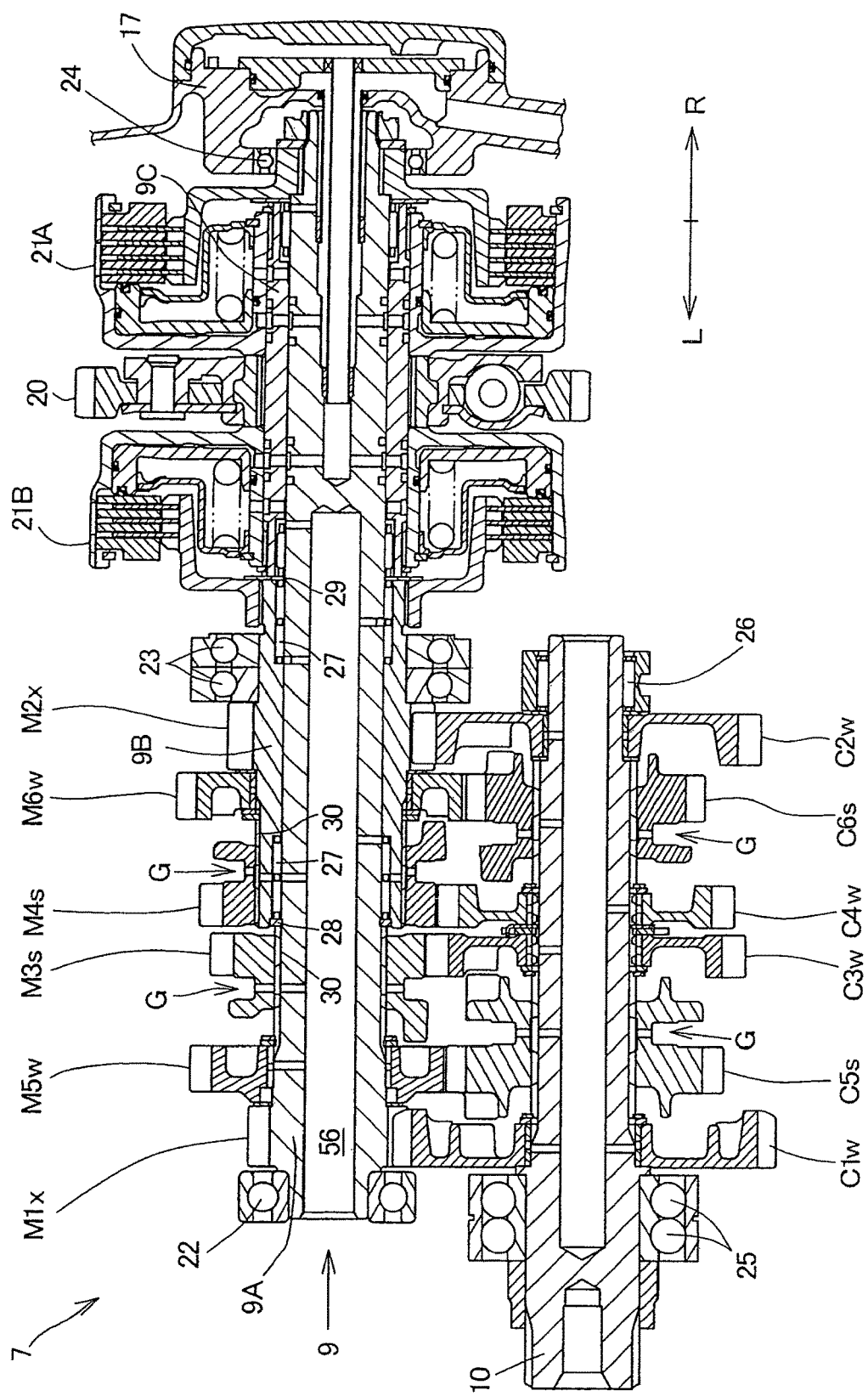
FIG. 2 is a sectional view of a transmission for the internal combustion engine.

FIG. 2 is a sectional view of the transmission 7.

The change mechanism including the shift drum and a shift fork is omitted in the drawing.

Arrows L and R indicate leftward and rightward directions corresponding to the left and right sides of the vehicle on which the internal combustion engine 1 is mounted.

The transmission 7 includes the main shaft 9, the counter shaft 10, a primary driven gear 20, and a pair of clutches 21 consisting of a first clutch 21A and a second clutch 21B.

Of the main shaft 9, the left end is rotatably borne on the crankcase 2 through a ball bearing 22, and a central portion on the crankcase 2 through a ball bearing 23.

The right end of the main shaft 9 is rotatably borne on the right crankcase cover 17 through a ball bearing 24.

Of the counter shaft, the left end is rotatably borne on the crankcase 2 through a ball bearing 25, and the right end on the crankcase 2 through a needle bearing 26.

The main shaft 9 includes a long main shaft inner shaft 9A, a main shaft outer shaft 9B, and a clutch part outer shaft 9C.

The main shaft outer shaft 9B covers a part of the main shaft inner shaft 9A in a relatively rotatable manner, with a needle bearing 27 therebetween.

The left end of the main shaft outer shaft 9B is restrained by a C-shaped snap ring 28 from leftward movement.

The right end of the main shaft outer shaft 9B abuts on the clutch part outer shaft 9C, with an annular spacer 29 therebetween, and is restrained from rightward movement.

Six gears M1 to M6 are provided on the main shaft 9, while six gears C1 to C6 constantly meshing with these gears M1 to M6 are provided on the counter shaft 10, correspondingly to the gears M1 to M6.

Here, M indicates that the gear belongs to the main shaft, while C indicates that the gear belongs to the counter shaft, and suffixes 1 to 6 indicate that the gears are for determining the first-speed to sixth-speed gear ratios, respectively.

The odd-numbered speed gears M1, M5 and M3 are provided on the main shaft inner shaft 9A, while the even-numbered speed gears M4, M6 and M2 are provided on the main shaft outer shaft 9B.

In FIG. 2, suffix x attached to the gear symbol indicates a fixed gear which is formed integrally with a shaft, suffix w indicates an idle gear which is held on a shaft and which can be rotated relative to the shaft at a predetermined position on the shaft, and suffix s indicates a slide gear which is slidable in the axial direction.

The slide gear is held on the shaft by splines 30 so that it is incapable of relative rotation to the shaft in the circumferential direction but is capable of sliding in the axial direction.

A gear meshed with the fixed gear (suffix x) or the slide gear (suffix s) is necessarily an idle gear (suffix w).

The idle gear (suffix w) cannot function as a gear by itself. For the idle gear (suffix w) to function as a gear, it must be fixed to the shaft by the slide gear (suffix s) provided adjacent thereto.

The slide gear is provided with an engaging groove G for engagement with the shift fork of the change mechanism (not shown). The slide gear (suffix s) is moved in the axial direction by the shift fork engaged therewith.

Figure 3:
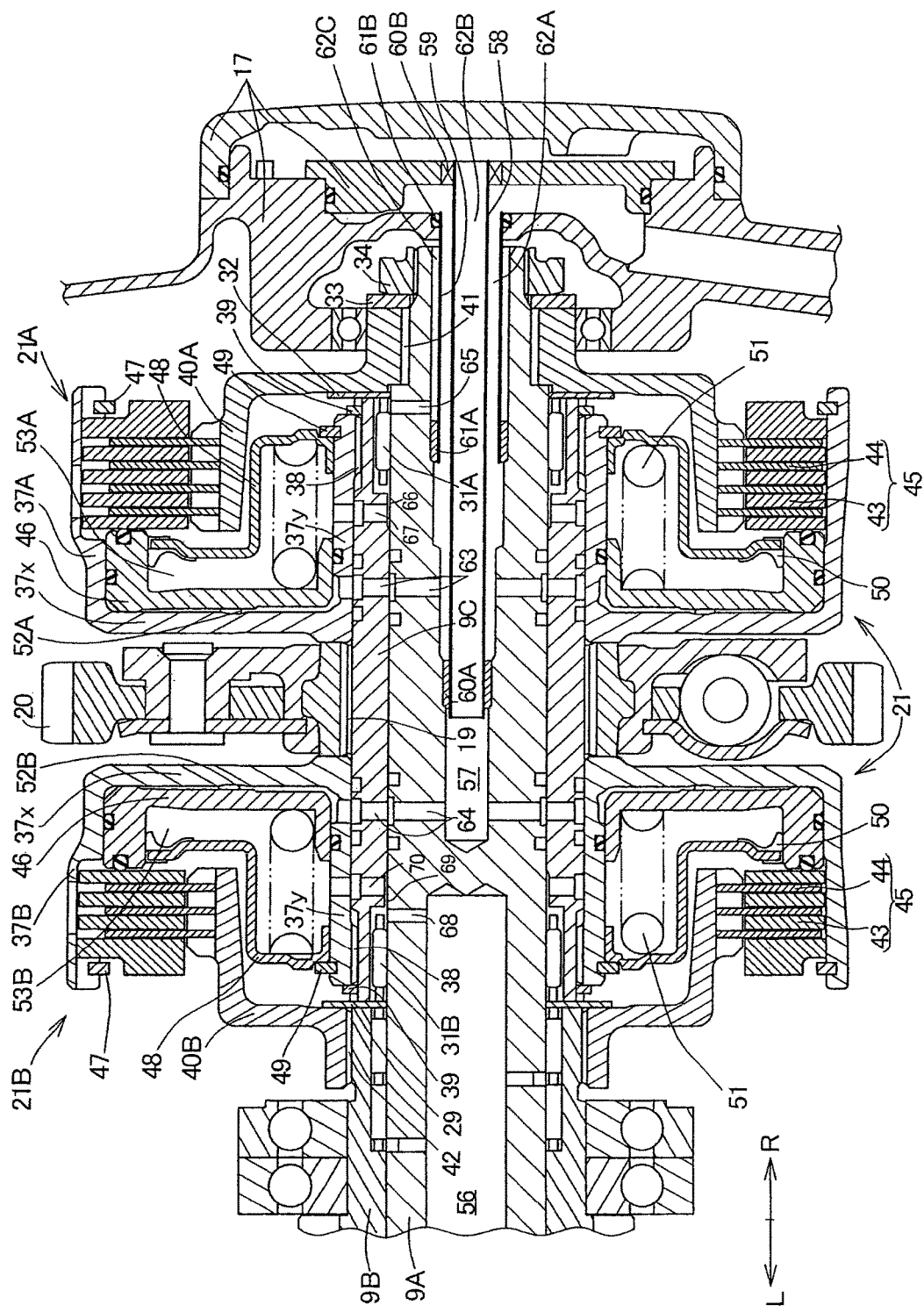
FIG. 3 is an enlarged view of the vicinity of a clutch.

FIG. 3 is an enlarged view of the vicinity of the clutches 21.

The clutch part outer shaft 9C is provided on a right half of the main shaft inner shaft 9A.

The clutch part outer shaft 9C covers the peripheries of end portions of the main shaft inner shaft 9A in a rotatable manner, with needle bearings 31A and 31B therebetween.

The right end of the clutch part outer shaft 9C abuts on another member, with an annular spacer 32 therebetween, and is restrained together with the member from movement, by a washer 33 and a nut 34 provided at an end of the main shaft inner shaft 9A.

The left end of the clutch part outer shaft 9C abuts on the right end of the main shaft outer shaft 9B, with the annular spacer 29 therebetween. The left end of the main shaft outer shaft 9B is restrained by the C-shaped snap ring 28 from movement (FIG. 2).

The primary driven gear 20 and clutch outers 37A and 37B of the first clutch 21A and the second clutch 21B are fixed to the clutch part outer shaft 9C by splines 38 and C-shaped snap rings 39, respectively.

The primary driven gear 20 is non-rotatably fitted to the clutch part outer shaft through splines 19.

Movements of the primary driven gear 20 in the left-right direction are restrained by the clutch outers 37A and 37B.

The primary driven gear 20 is a gear in constant mesh with a primary drive gear (not shown) provided on the crankshaft 8, and, by receiving a rotational driving force from the crankshaft 8, drives the clutch part outer shaft 9C to rotate.

According to this, the clutch outers 37A and 37B of the pair of clutches 21 are rotated together.

Clutch inners 40A and 40B of these clutches 21 are connected respectively to separate members.

The clutch inner 40A of the first clutch 21A is fitted to splines 41 at the right end of the main shaft inner shaft 9A, and is fixed to the main shaft inner shaft 9A by the washer 33 and the nut 34.

The clutch inner of the second clutch 21B is fixed by being fitted to splines 42 at the right end of the main shaft outer shaft 9B.

The pair of clutches 21A and 21B are both multiple disc clutches.

On the inside of an outer circumferential portion of each of the clutch outers 37A and 37B of the pair of clutches 21, a plurality of drive friction discs 43 are provided which are engaged with the clutch outer 37 so as to be incapable of relative rotation but capable of axial movement.

On the outside of each of the clutch inners 40 of the pair of clutches 21, a plurality of driven friction discs 44 are provided which are engaged with the clutch inner 40 so as to be incapable of relative rotation but capable of axial movement.

The drive friction discs 43 and the driven friction discs 44 are alternately disposed to constitute a friction disc group 45.

A pressure plate 46 is provided between an end plate part 37x of the clutch outer 37A, 37B and the friction disc group 45 in each of the clutches 21. An end portion of an outer circumferential portion of the pressure plate 46 abuts on the drive friction disc 43 at one end of the friction disc group 45.

The drive friction disc 43 at the other end of the friction disc group 45 is restrained by a C-shaped snap ring 47 from movement.

A spring bearing member 48 is provided between the pressure plate 46 and the clutch inner 40.

The inner circumferential end of the spring bearing member 48 is restrained from movement, by a C-shaped snap ring 49 provided on a clutch outer boss part 37y.

The outer circumferential end of the spring bearing member 48 is in sliding contact with the inside of an outer circumferential portion of the pressure plate 46, with a seal member 50 therebetween.

The pressure plate 46 is pressed toward the clutch outer end plate part 37x, by a coil spring 51 abutting on the spring bearing member 48 at its one end.

A pressurization chamber 52 (52A, 52B) is formed between the clutch outer end plate part 37x and the pressure plate 46.

A pressure regulation chamber 53 (53A, 53B) is formed between the spring bearing member 48 and the pressure plate 46.

The pressure regulation chamber 53 is a chamber such that a pressure increase in the pressure chamber 52 by a centrifugal force is canceled by a pressure increase due to a centrifugal force exerted on the oil in the pressure regulation chamber 53, whereby the clutch is disengaged.

The main shaft inner shaft 9A is provided with a main shaft left-side center hole 56 opening to the left side, and a main shaft right-side center hole 57 opening to the right side.

The right-side center hole 57 is a stepped hole having a plurality of stages of inside diameter.

Two coaxial pipes, namely, an inner pipe 58 and an outer pipe 59 are inserted in the right-side center hole 57.

A left end portion of the inner pipe 58 is fitted in the small-diameter portion of the right-side center hole 57, with a seal member 60A therebetween. A right end portion of the inner pipe 58 is supported on the right crankcase 17, with a seal member 60B therebetween. The inside of the inner pipe 58 and the outside of the inner pipe 58 are partitioned from each other through the seal members 60A and 60B.

A left end portion of the outer pipe 59 is fitted in the large-diameter portion of the right-side center hole 57, with a seal member 61A therebetween. A right end portion of the outer pipe 59 is supported on the right crankcase 17, with a seal member 61B therebetween. The inside of the outer pipe 59 and the outside of the outer pipe 59 are partitioned from each other by the seal members 61A and 61B.

An oil passage formed between the outside of the inner pipe 58 and the inside of the outer pipe 59 and the inside of the middle-diameter portion of the right-side center hole 57 is referred to as main shaft end first oil passage 62A; an oil passage connecting the inner bore of the inner pipe 58 with the small-diameter portion of the right-side center hole 57 is referred to as main shaft end second oil passage 62B; and an oil passage formed between the outside of the outer pipe 59 and the inside of the large-diameter portion of the right-side center hole 57 is referred to as main shaft end third oil passage 62C.

The main shaft end first oil passage 62A communicates with the pressurization chamber 52A of the first clutch 21A through oil passages 63 which radially penetrate the main shaft inner shaft 9A and the clutch part outer shaft 9C for the communication.

The main shaft end second oil passage 62B communicates with the pressurization chamber 52B of the second clutch 21B through oil passages 64 which radially penetrate the main shaft inner shaft 9A and the clutch part outer shaft 9C for the communication.

The main shaft end third oil passage 62C communicates with the pressure regulation chamber 53A of the first clutch 21A through an oil passage 65 which radially penetrates the main shaft inner shaft 9A, the needle bearing 31A, a main shaft inner shaft outer circumferential gap oil passage 66, and an oil passage 67 which radially penetrates the clutch part outer shaft 9C.

Incidentally, the main shaft left-side center hole 56 communicates with the pressure regulation chamber 53B of the second clutch 21B through an oil passage 68 which radially penetrates the main shaft inner shaft 9A, the needle bearing 31B, a main shaft inner shaft outer circumferential gap oil passage 69, and an oil passage 70 which radially penetrates the clutch part outer shaft 9C.

Figure 4:
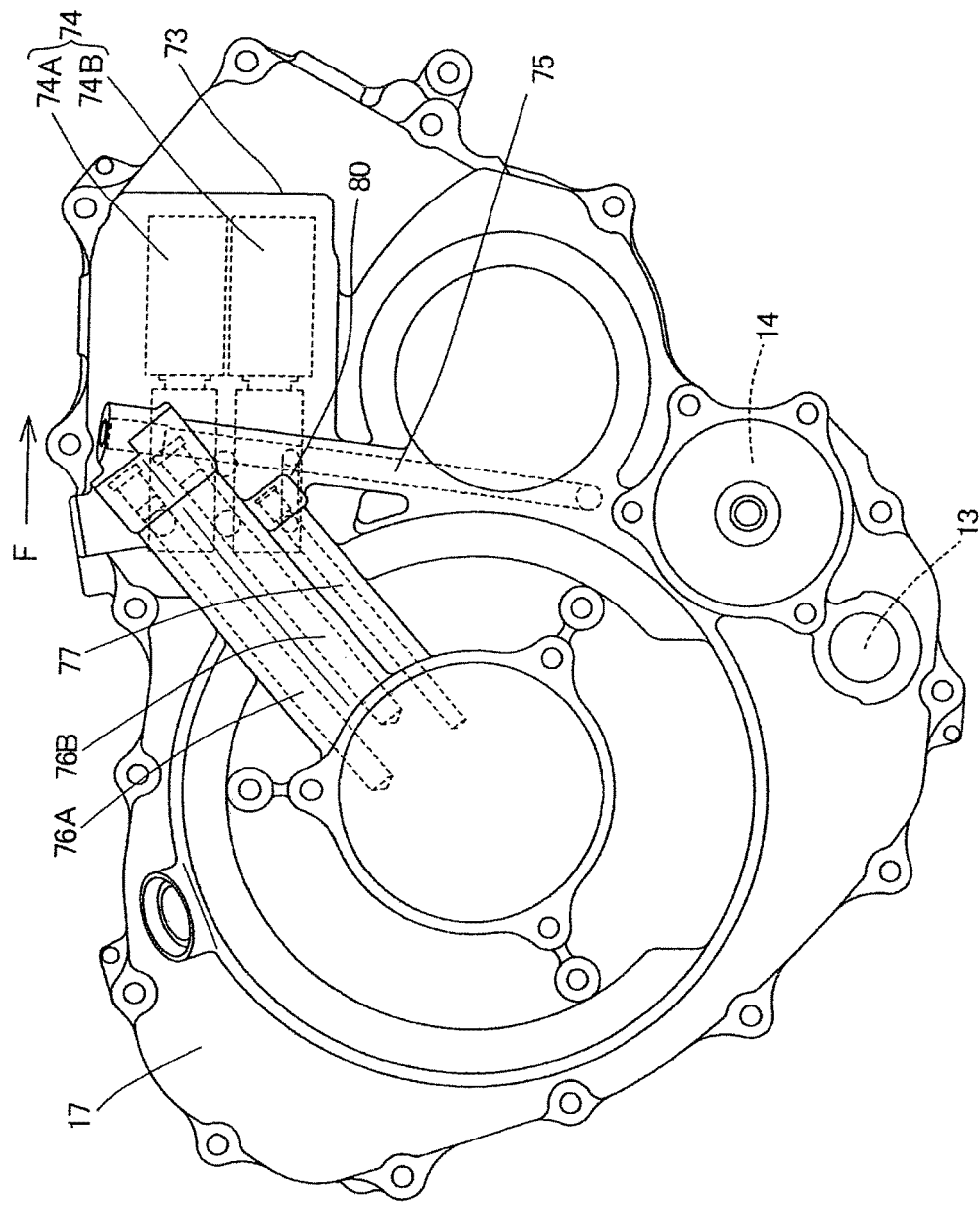
FIG. 4 is an outside view of a right crankcase cover.

FIG. 4 is an outside view of the right crankcase cover 17.

A pair of clutch actuators 74, namely, an upper-side clutch actuator 74A and a lower-side clutch actuator 74B are accommodated in the clutch actuator accommodating case 73 provided at the inside surface of the right crankcase cover 17.

Pipe parts are bulging in the form of folds on the outside surface of the right crankcase cover 17. A single supply oil passage 75 which extends from the control oil pump 13 toward the clutch actuators 74 through the control oil filter 14, and control oil passages 76A and 76B and a lubricating oil passage 77 which extend from the clutch actuators 74 toward the clutches 21, are provided in the pipe parts.

The control oil passage 76A extending from the upper-side clutch actuator 74A reaches the main shaft end first oil passage 62A in FIG. 3. A control oil is fed from the upper-side clutch actuator 74A to the pressurization chamber 52A of the first clutch 21A.

The control oil passage 76B extending from the lower-side clutch actuator 74B reaches the main shaft end second oil passage 62B. The control oil is fed from the lower-side clutch actuator 74B to the pressurization chamber 52B of the second clutch 21B.

The lubricating oil passage 77 branched and extended from the supply oil passage 75 through a communicating oil passage 80 reaches the main shaft end third oil passage 62C. The control oil is constantly fed from the supply oil passage 75 to the pressure regulation chamber 53A of the first clutch 21A, as a lubricating oil.

Incidentally, the pressure regulation chamber 53B of the second clutch 21B is fed with the lubricating oil from the main shaft left-side center hole 56 communicating with the lubricating oil pump.

In each of the oil passages mentioned above, the oil reciprocates according to engagement and disengagement of the relevant clutch.

It should be noted here, however, that the oil in the supply oil passage and the lubricating oil in the main shaft left-side center hole 56 do not reciprocate.

Figure 5:
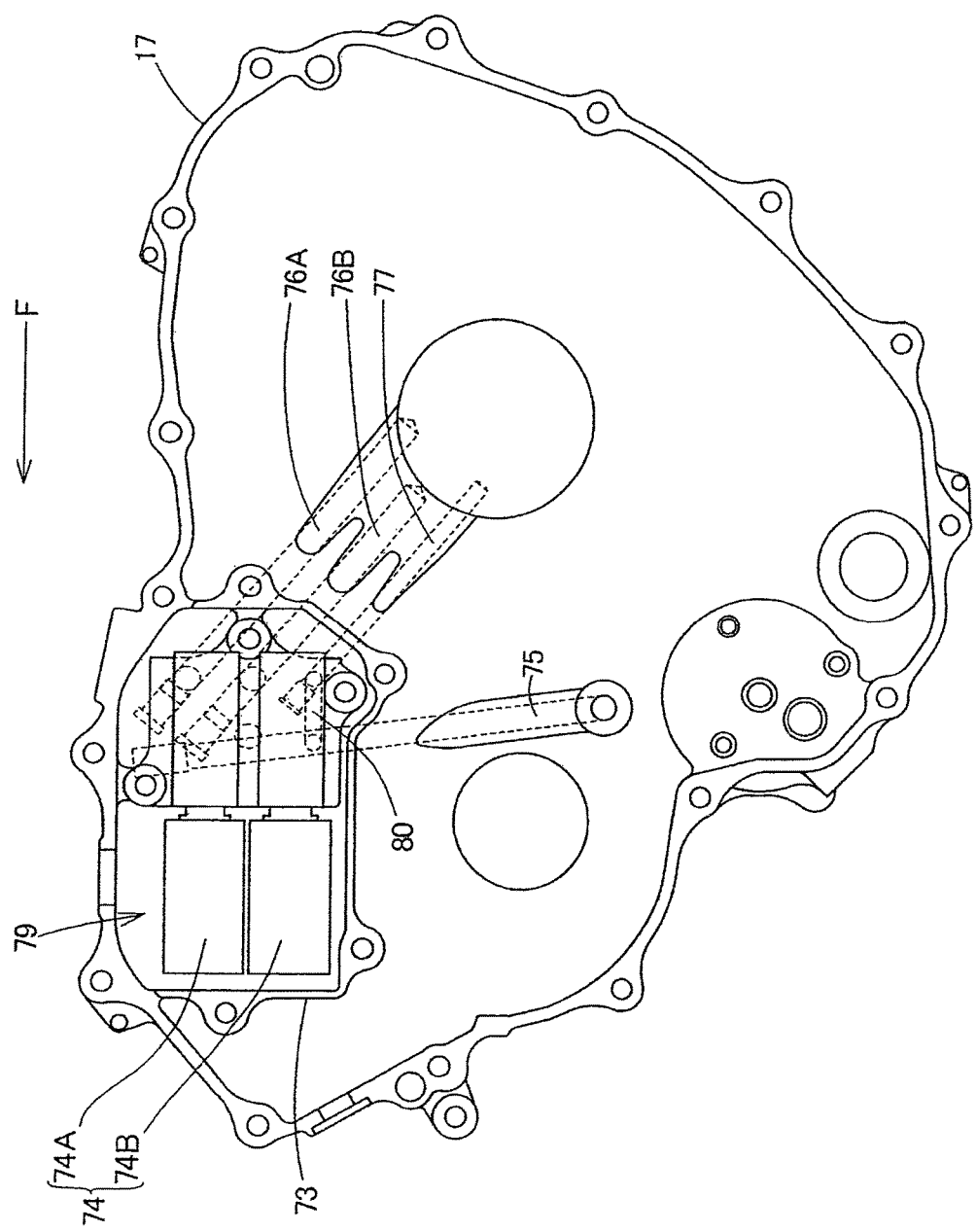
FIG. 5 is an inside view of the right crankcase cover.

FIG. 5 is an inside view of the right crankcase cover 17. The lubricating oil passage 77 communicates with the supply oil passage 75 through the communicating oil passage 80. The clutch actuator accommodating case 73 in which the clutch actuators 74 are accommodated is covered with a cover member 78 shown in FIG. 6.

Figure 6:
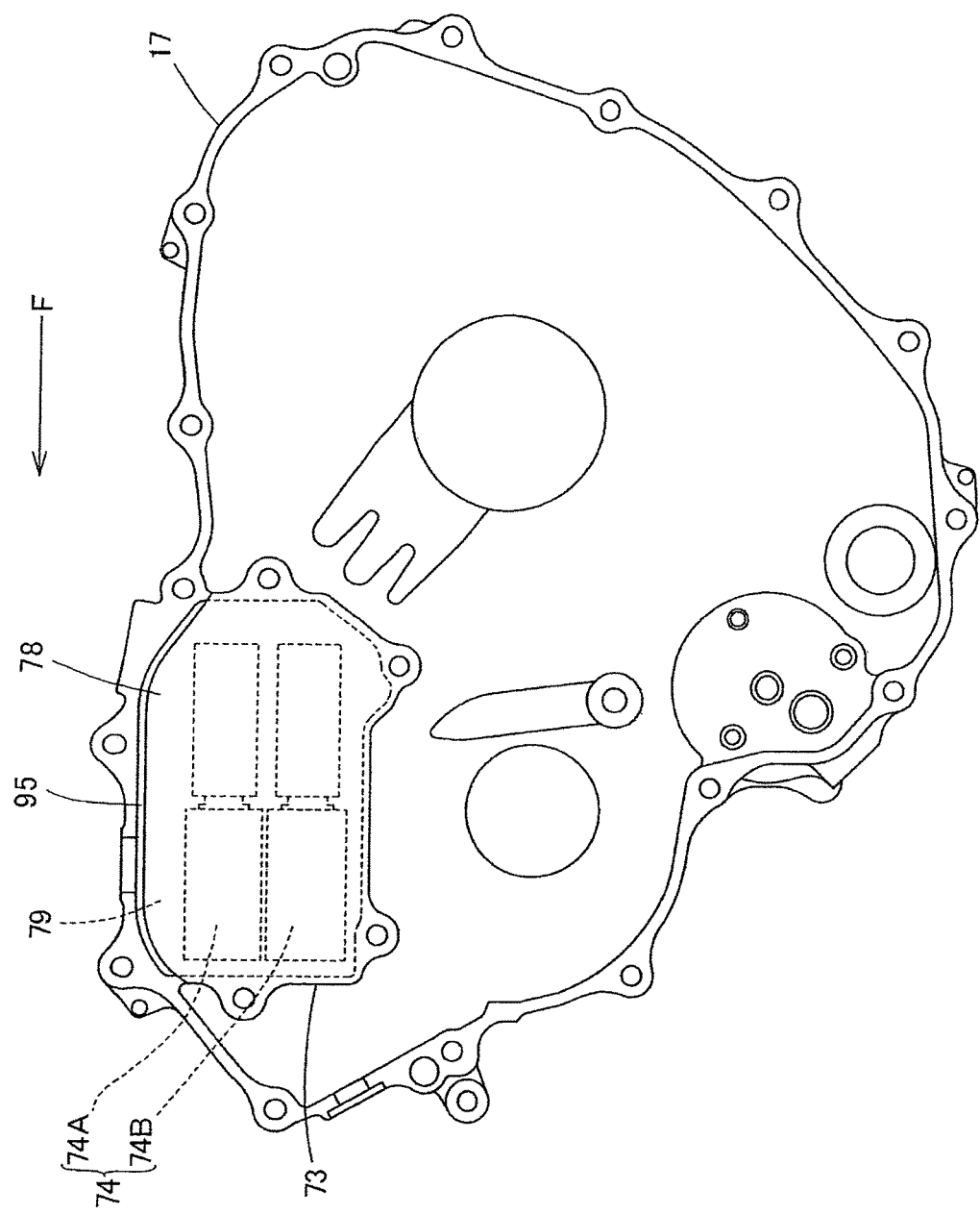
FIG. 6 is a view showing a condition where a clutch actuator accommodating case is covered with a cover member.

FIG. 6 is an inside view of the right crankcase cover 17, showing a condition where the clutch actuator accommodating case 73 is covered with the cover member 78.

The inside of this member functions as an oil sump part 79, and the return oil from the clutches 21 is discharged into the oil sump part 79.

A gap 95 is provided at an upper portion of the clutch actuator accommodating case 73, so that surplus oil is discharged through the gap 95 into the inside of the crankcase 2.

FIG. 7 illustrates the structure and operation of the clutch actuator 74.

Two clutch actuators 74 having this configuration are provided, as above-mentioned.

In FIG. 7, the clutch actuator 74 includes: a magnet coil 83 accommodated in a solenoid case 82; an iron piece 84 receiving an electromagnetic force of the magnet coil 83; a valve case 85; a valve element 86 accommodated in the valve case 85; a connecting rod 87 for connecting the iron piece 84 with the valve element 86; a return spring 88; and a spring bearing cover 89 for bearing the outer end of the return spring 88.

The iron piece 84 and the connecting rod 87 and the valve element 86 are moved rectilinearly in the valve case 85, as one body. The valve case 85 is provided therein with the supply oil passage 75, the control oil passage 76, the lubricating oil passage 77 (FIG. 11), the communicating oil passage 80 (FIG. 11), a pressure regulation oil passage 90 which is branched from the control oil passage to reach an end portion of the valve element, and a return oil discharge oil passage 91.

Figure 7A:
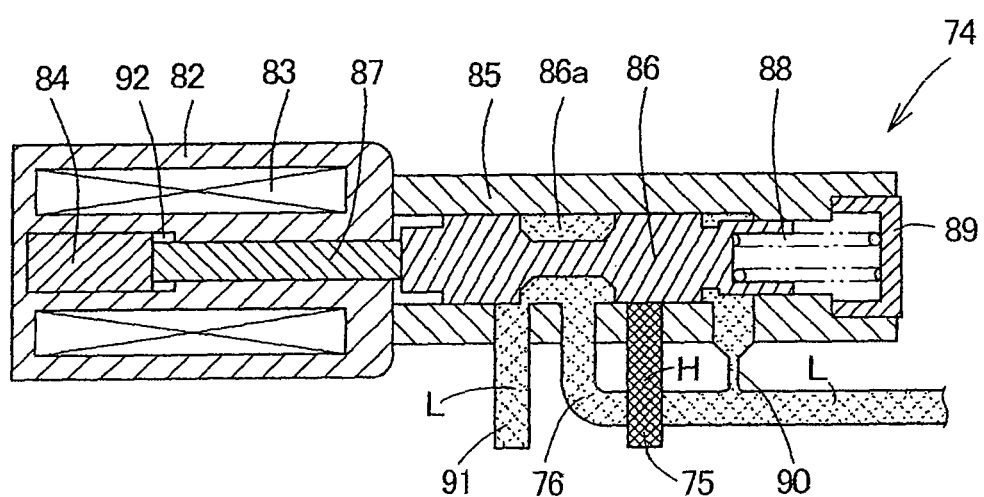
FIG. 7 illustrates the structure and operation of a clutch actuator.

FIG. 7(a) shows the position of the valve element 86 when the clutch actuator 74 is OFF.

In FIG. 7, the densely crosshatched parts H indicate a high-pressure oil, while coarsely crosshatched parts L indicate a low-pressure oil. An end portion on the valve side of the supply oil passage 75 supplied with the high-pressure oil from the oil pump 13 is shut off by the valve element 86, whereby the oil is stopped.

Figure 7B:
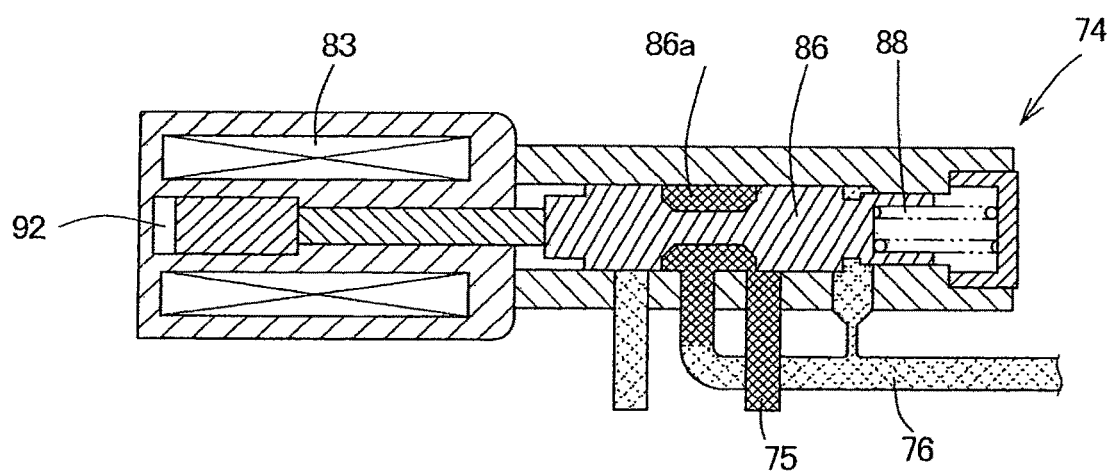

FIG. 7(b) shows the position of the valve element 86 at the moment the magnet coil 83 is energized to turn ON the clutch actuator 74.

The valve element 86 has been moved to the right end of an iron piece moving space 92 in the figure, against the biasing force of the return spring 88. There is shown a condition where the supply oil passage 75 and space at a small-diameter portion 86a of the valve element 86 communicate with each other, the high-pressure oil has started flowing into the control oil passage 76, and the oil pressure is rising.

Figure 7C:
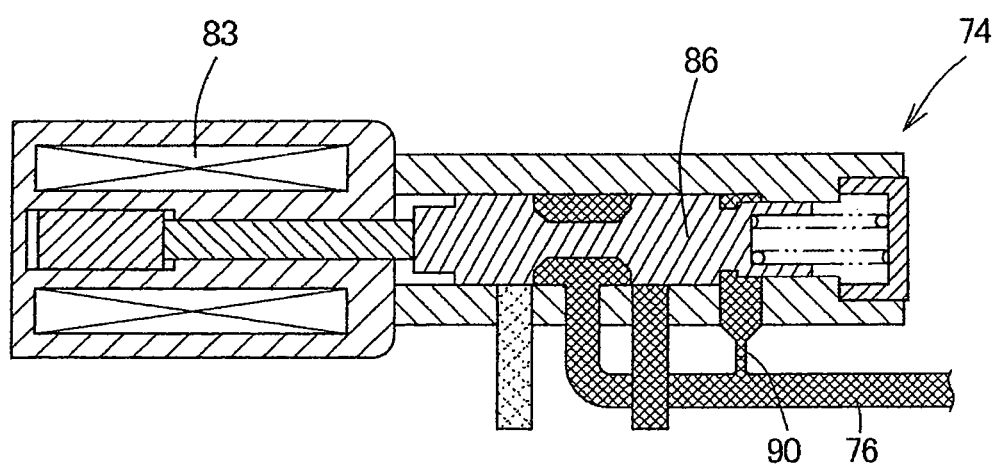

FIG. 7(c) shows a condition where the pressure rise is completed.

The pressure in the pressure regulation oil passage 90 branched from the control oil passage 76 has also been raised, and the high pressure in the pressure regulation oil passage 90 acts on the end portion side of the valve element 86, so that the valve element 86 is pushed back a little.

As a result, a valve-side end portion of the supply oil passage 75 is shut off by the valve element 86, so that the supply of the high-pressure oil into the control oil passage 76 is stopped. In addition, since an actuator-side end portion of the control oil passage 76 is also shut off, the inside of the pressurization chamber 52 (FIG. 3) of the clutch 21 is maintained at a high pressure, the pressure plate is pushed, and the multiple disc clutch 21 is put into an engaged state.

When an instruction to turn OFF the clutch actuator 74 is given, the energizing of the magnet coil 83 is stopped, so that the electromagnetic force for pushing the valve element 86 is lost, and the valve element 86 is returned to the position in FIG. 7(a) by the biasing force of the return spring 88.

As a result, the control oil passage 76 communicates with the return oil discharge oil passage 91, and the oil is returned from the clutch 21 by the action of the coil spring 51 in the pressure regulation chamber 53 of the clutch 21, to be discharged from the return oil discharge oil passage 91. Consequently, the multiple disc clutch 21 is disengaged.

The oil thus discharged collects in the oil sump part 79 in the clutch actuator accommodating case 73.

The clutch actuators 74 are immersed in this oil.

The oil flows through the gap at the spring bearing cover 89 into the gap between the valve case 85 and the valve element 86, to lubricate the sliding surfaces. Besides, since the clutch actuators 74 are immersed in the oil, the operating sounds generated from the clutch actuators 74 are intercepted, and transmission of the sounds to the exterior is suppressed.

Figure 8:
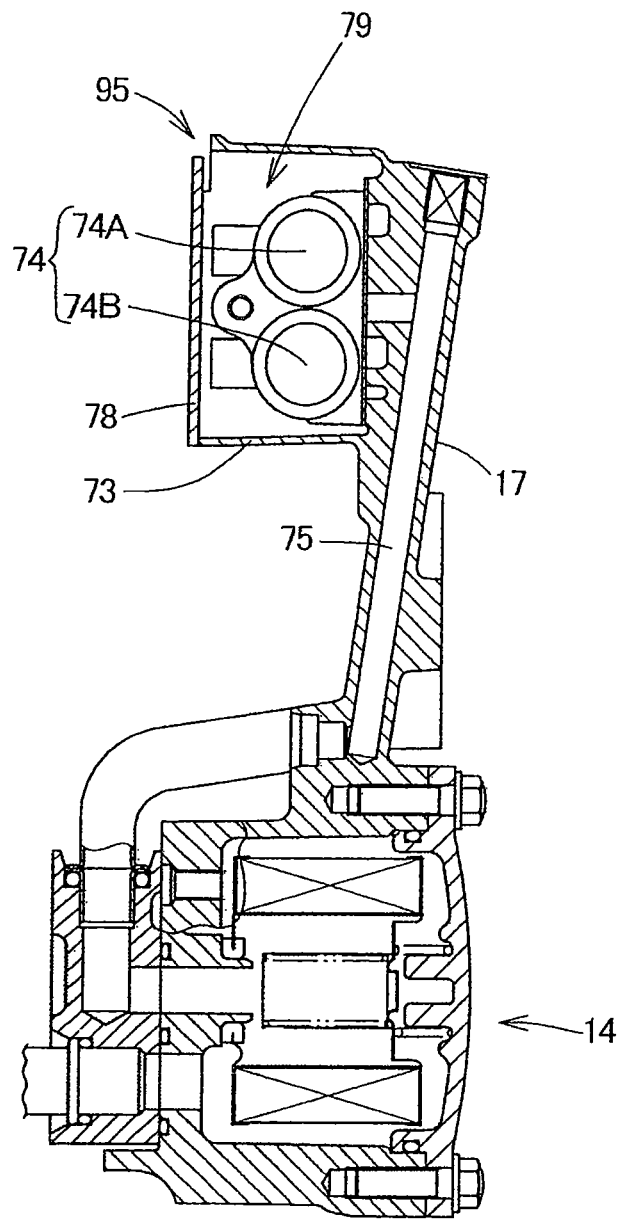
FIG. 8 is a sectional view of a supply oil passage for supplying oil to the clutch actuator.

FIG. 8 is a sectional view of the supply oil passage 75 for supplying the oil from the control oil pump 13 to the clutch actuators 74 through the control oil filter 14.

The supply oil passage 75 is formed in a wall body of the right crankcase cover 17.

Two clutch actuators 74 are accommodated, at upper and lower positions, in the clutch actuator accommodating case 73.

The oil is supplied into an intermediate area between the clutch actuators 74, to be supplied respectively to the upper-side clutch actuator 74A and the lower-side clutch actuator 74B.

A gap 95 is provided at an upper joint portion between the clutch actuator accommodating case 73 and the cover member 78 for covering an opening of the clutch actuator accommodating case 73. Therefore, surplus oil is discharged into the inside of the crankcase 2.

Figure 9:
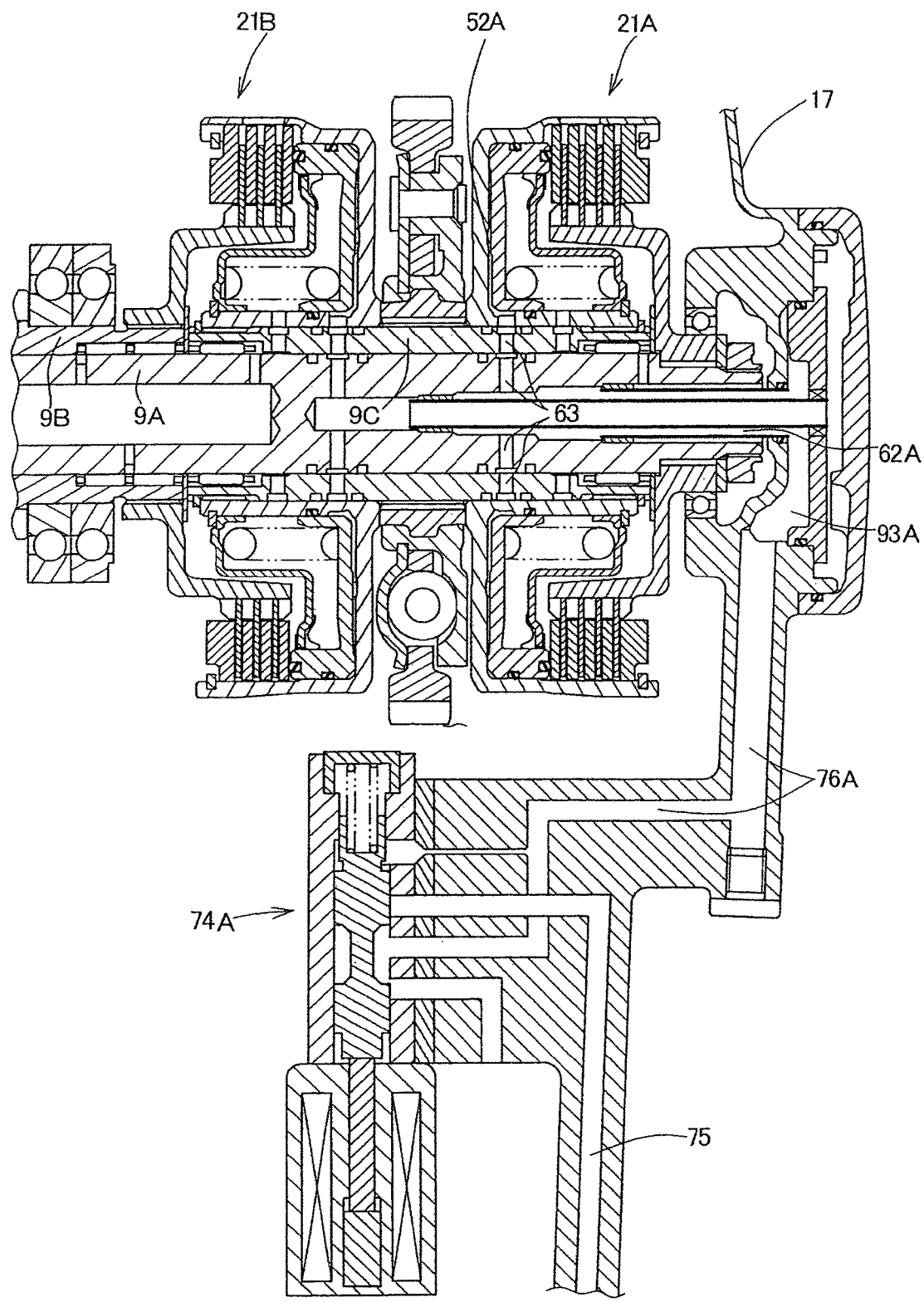
FIG. 9 is a sectional view of a control oil passage communicating with a pressurization chamber in a first clutch.

FIG. 9 is a sectional view of the control oil passage 76A extending from the upper-side clutch actuator 74A to the pressurization chamber 52A of the first clutch 21A.

This oil passage extends through a right crankcase cover inside space 93A and the main shaft end first oil passage 62A, and through the oil passages 63, to reach the pressurization chamber 52A of the first clutch 21A.

When the high-pressure oil is supplied into the pressurization chamber 52A of the first clutch 21A, the pressure plate 46 is moved toward the friction disc group 45 against the biasing force of the coil spring 51. As a result, the friction discs are pressed against one another, so that the rotation of the clutch outer 37A is transmitted to the clutch inner 40A, and the main shaft inner shaft 9A is driven to rotate.

Figure 10:
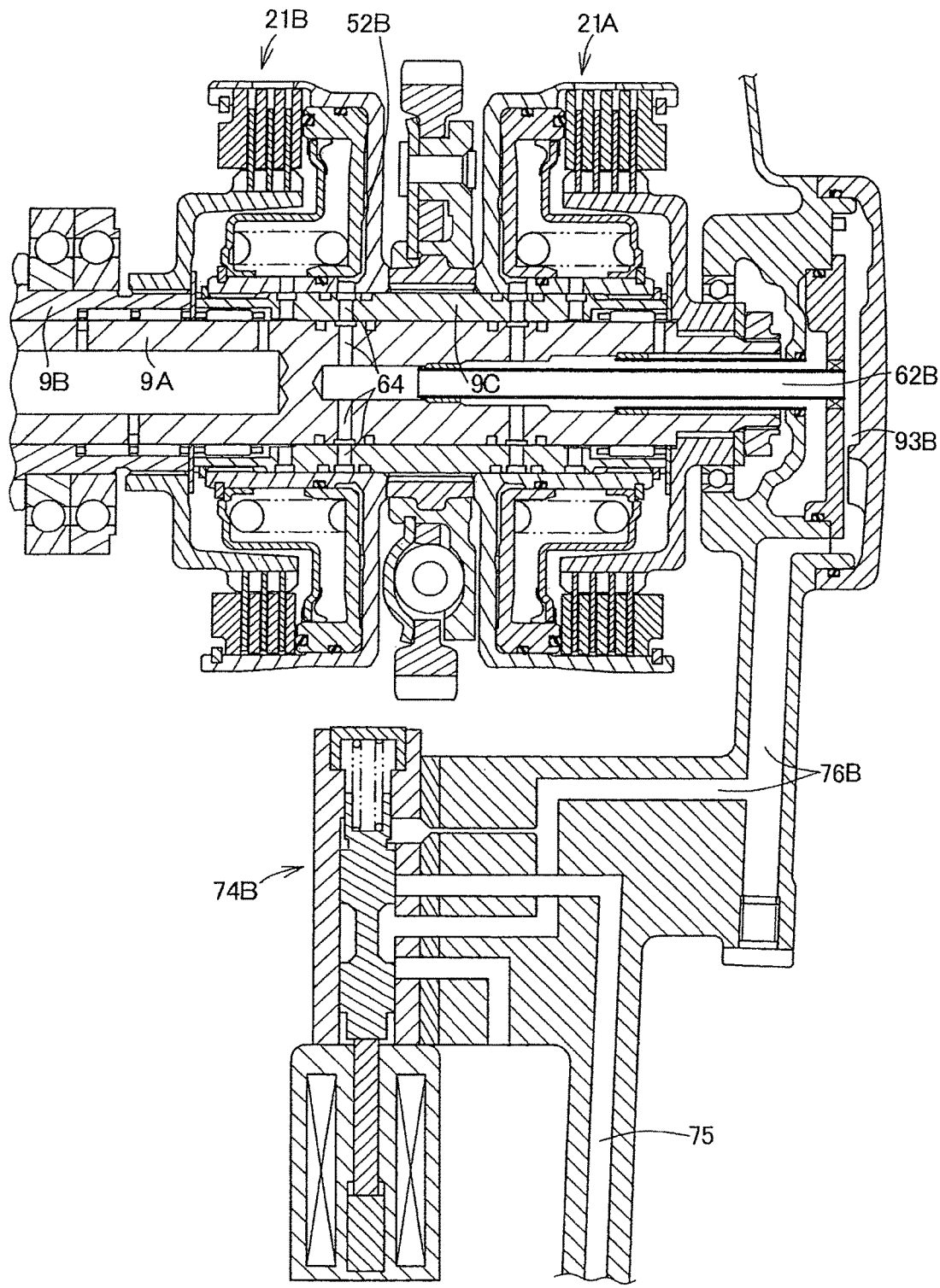
FIG. 10 is a sectional view of a control oil passage communicating with a pressurization chamber in a second clutch.

FIG. 10 is a sectional view of the control oil passage 76B extending from the lower-side clutch actuator 74B to the pressurization chamber 52B of the second clutch 21B.

This oil passage extends through a right crankcase cover inside space 93B and the main shaft end second oil passage 62B, and through the oil passages 64, to reach the pressurization chamber 52B of the second clutch 21B.

When the high-pressure oil is supplied into the pressurization chamber 52B of the second clutch 21B, the pressure plate 46 is moved toward the friction disc group 45 against the biasing force of the coil spring 51. Consequently, the friction discs are pressed against one another, so that the rotation of the clutch outer 37B is transmitted to the clutch inner 40B, and the main shaft outer shaft 9B is driven to rotate.

Figure 11:
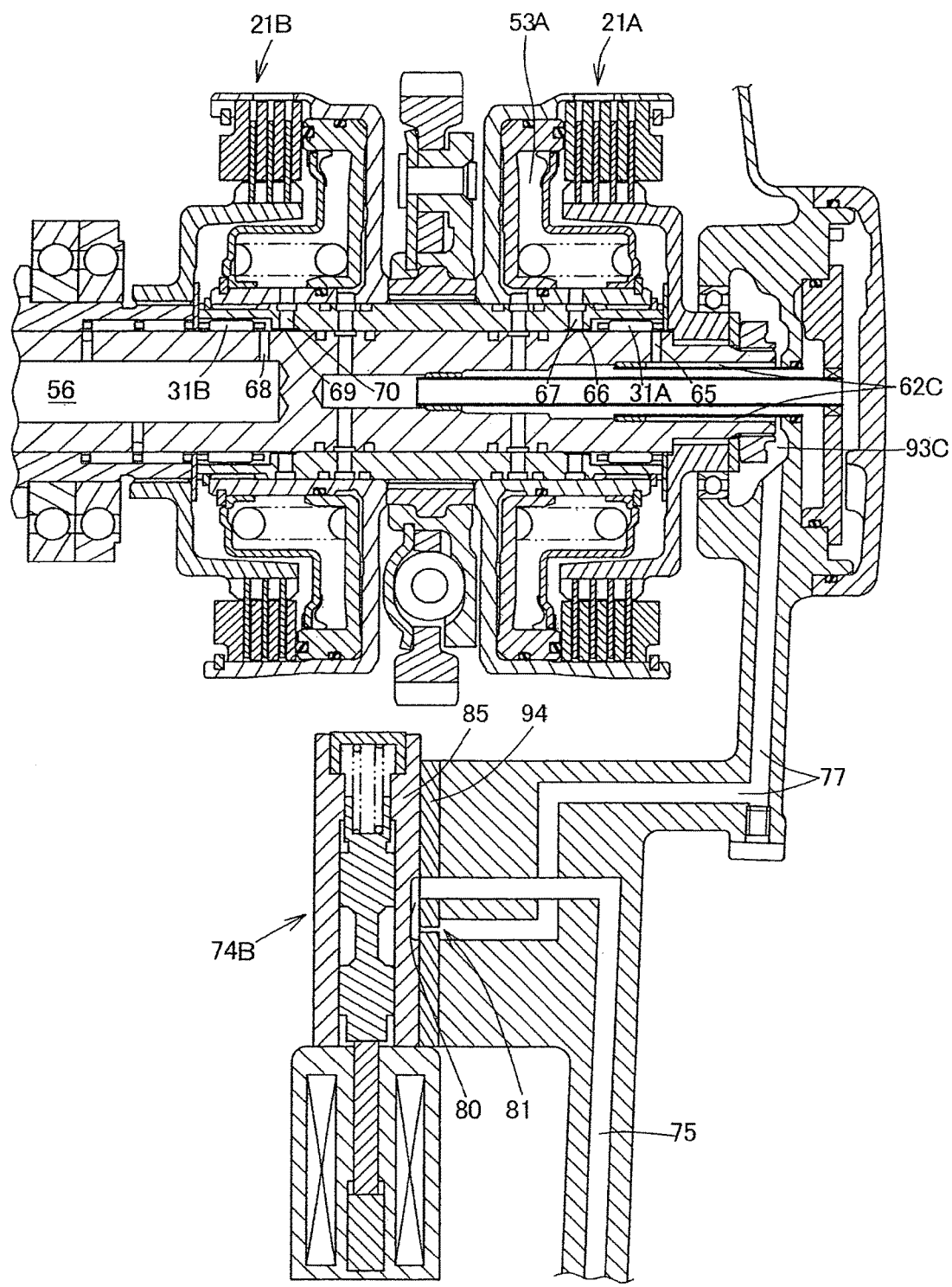
FIG. 11 is a sectional view of a lubricating oil passage communicating with a pressure regulation chamber in the first clutch.

FIG. 11 is a sectional view of the lubricating oil passage 77 extending from the lower-side clutch actuator 74B to the pressure regulation chamber 53A of the first clutch 21A.

This oil passage includes the communicating oil passage 80 which is formed, between the valve case 85 and a plate 94 in the lower-side clutch actuator 74B, so as to make the supply passage 75 and the lubricating oil passage 77 communicate with each other. The high-pressure oil supplied through the supply oil passage 75 is constantly supplied to the lubricating oil passage 77 through the communicating oil passage 80.

The plate 94 is provided with an orifice 81, to contrive a lowering in the pressure of the oil supplied into the lubricating oil passage 77.

The lubricating oil passage 77 extends through a right crankcase cover inside space 93C and the main shaft end third oil passage 62C, then through the oil passage 65, the needle bearing 31A, and the oil passages 66 and 67, to reach the pressure regulation chamber 53A of the first clutch 21A. The high-pressure oil is supplied through the lubricating oil passage 77 into the pressure regulation chamber 53A.

The oil thus supplied lubricates the needle bearing 31A.

Incidentally, the pressure regulation chamber 53 of the second clutch 21B is supplied with a low-pressure lubricating oil from the main shaft left-side center hole 56 through the oil passage 68, the needle bearing 31B, and the oil passages 69, 70.

The pair of clutch actuators are so operated that when one of them is ON, the other of them is OFF.

Which one of the pair of clutch actuators is to be turned ON is automatically decided by an electronic control unit (not shown).

At the time of starting the engine, the clutch actuator operation is carried out in order to confirm the operating conditions of the clutch actuators. The oil discharged in this operation can be reserved in the oil sump part 79.

Therefore, even in the case where the vehicle has been left non-operated for a long time, the condition where the oil is reserved in the oil sump part 79 is attained at the time of operating the engine. This contributes to prevention of leakage of operating sounds and to lubrication.

While the embodiment of the present invention has been described presuming its application to a clutch mechanism, the technology of preventing leakage of actuator operating sounds can also be applied to other oil pressure control mechanisms.

Besides, while the clutch actuators are of the horizontal type in the embodiment above, they may be of the vertical type. The clutch actuators may be disposed not only in the right crankcase cover but also in any other part in the crankcase.

Figure 12:
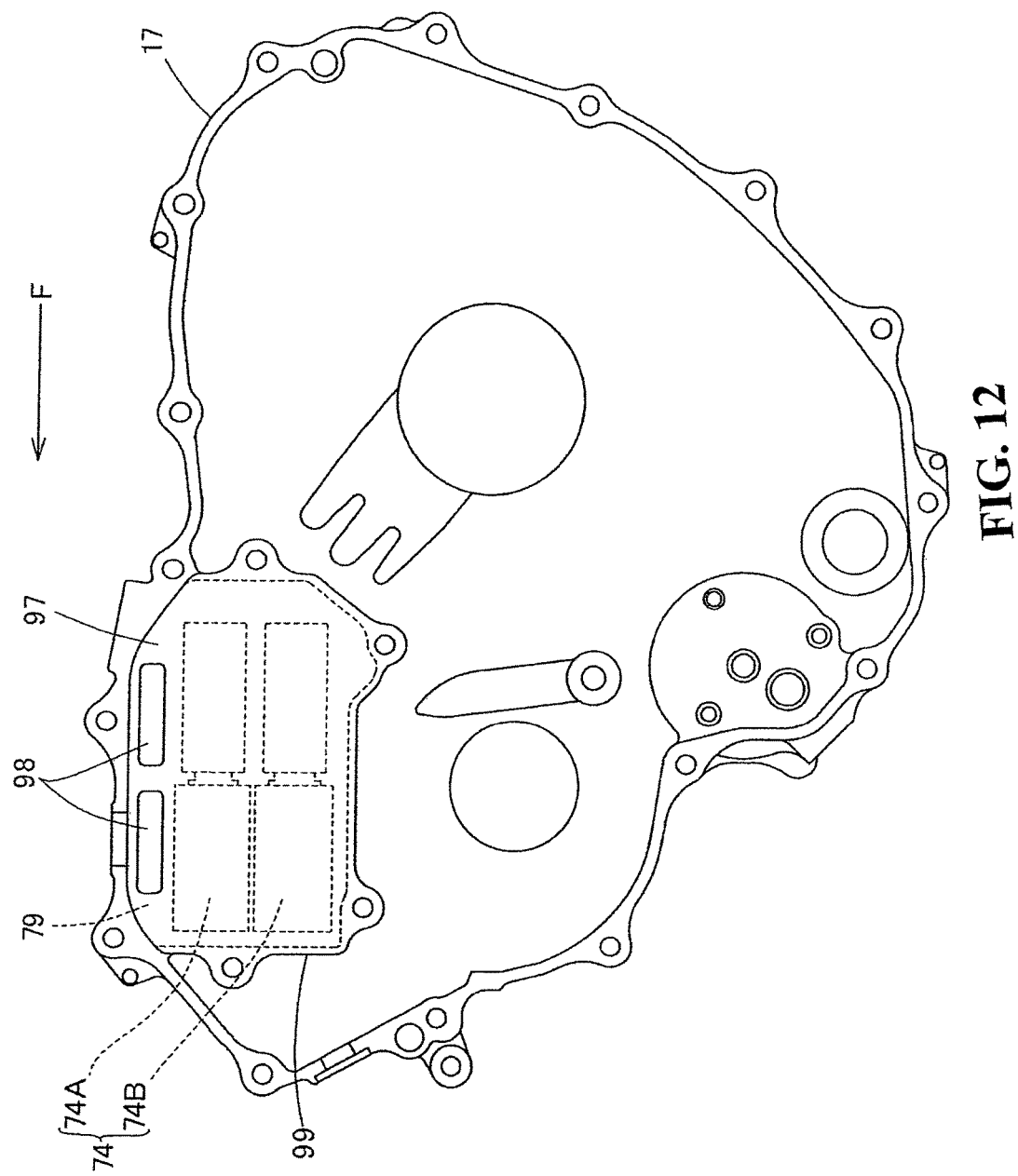
FIG. 12 is a view showing a condition where the clutch actuator accommodating case is covered with a cover member according to a second embodiment of the present invention.

FIG. 12 is an inside view of the right crankcase cover 17, showing a condition where a clutch actuator accommodating case 99 is covered with a cover member 97 according to a second embodiment of the present invention.

The accommodating case 99 is not provided with such an upper-portion gap as provided in the first embodiment. Instead, the accommodating case 99 is provided with oil return holes 98 at positions on the upper side of the upper-side actuator 74A, whereby surplus oil is discharged to the inside of the crankcase 2.

Figure 13:
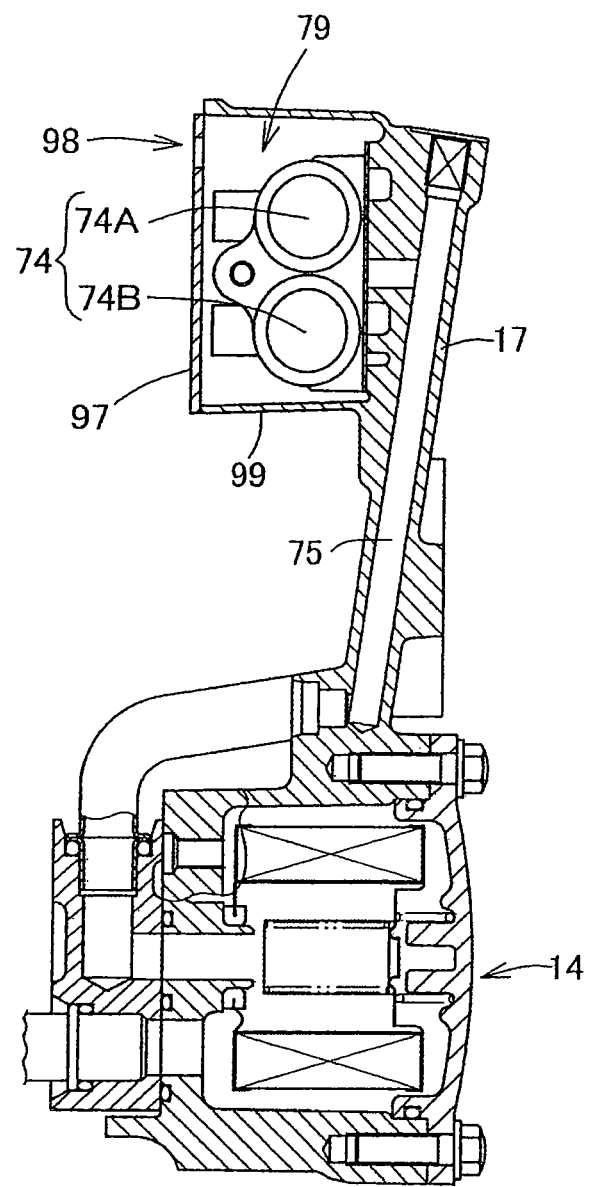
FIG. 13 is a sectional view showing a condition where the cover member according to the second embodiment is mounted to the clutch actuator accommodating case.

FIG. 13 is a sectional view showing a condition where the cover member 97 according to the second embodiment is mounted to the clutch actuator accommodating case 99. The surplus oil is discharged through the oil return holes 98.

In the internal combustion engines 1 in the first and second embodiments described above, the crankshaft 8 is rotatably borne on the bearings at the mating surfaces of the upper crankcase 2A and the lower crankcase 2B of the crankcase bisected to the upper and lower components, while the main shaft 9 and the counter shaft 10 of the transmission are also rotatably borne on the same mating surfaces, and the crankshaft 8, the main shaft 9 and the counter shaft 10 are arranged substantially at the same height and on the rear side in this order.

In addition, the clutch actuator 74 disposed in the oil sump part 79 formed in the inner surface of the right crankcase cover 17 is located on the upper side of the crankshaft 8 in side view of the internal combustion engine shown in FIG. 1.

In contrast to the first and second embodiments, a parallel 2-cylinder internal combustion engine 100 according to a third embodiment shown in FIGS. 14 to 17 has a configuration wherein a crankshaft 108 and a counter shaft 110 are rotatably borne on bearings at mating surfaces of an upper crankcase 102A and a lower crankcase 102B of a crankcase bisected into the upper and lower components, but a main shaft 109 is disposed, between the crankshaft 108 and the counter shaft 110, above the mating surfaces. In FIGS. 14 to 17, elements 76A and 76B denote control oil passages, element 121 denotes an oil sump part, and element 121a denotes an oil sump cover member.

Figure 14:
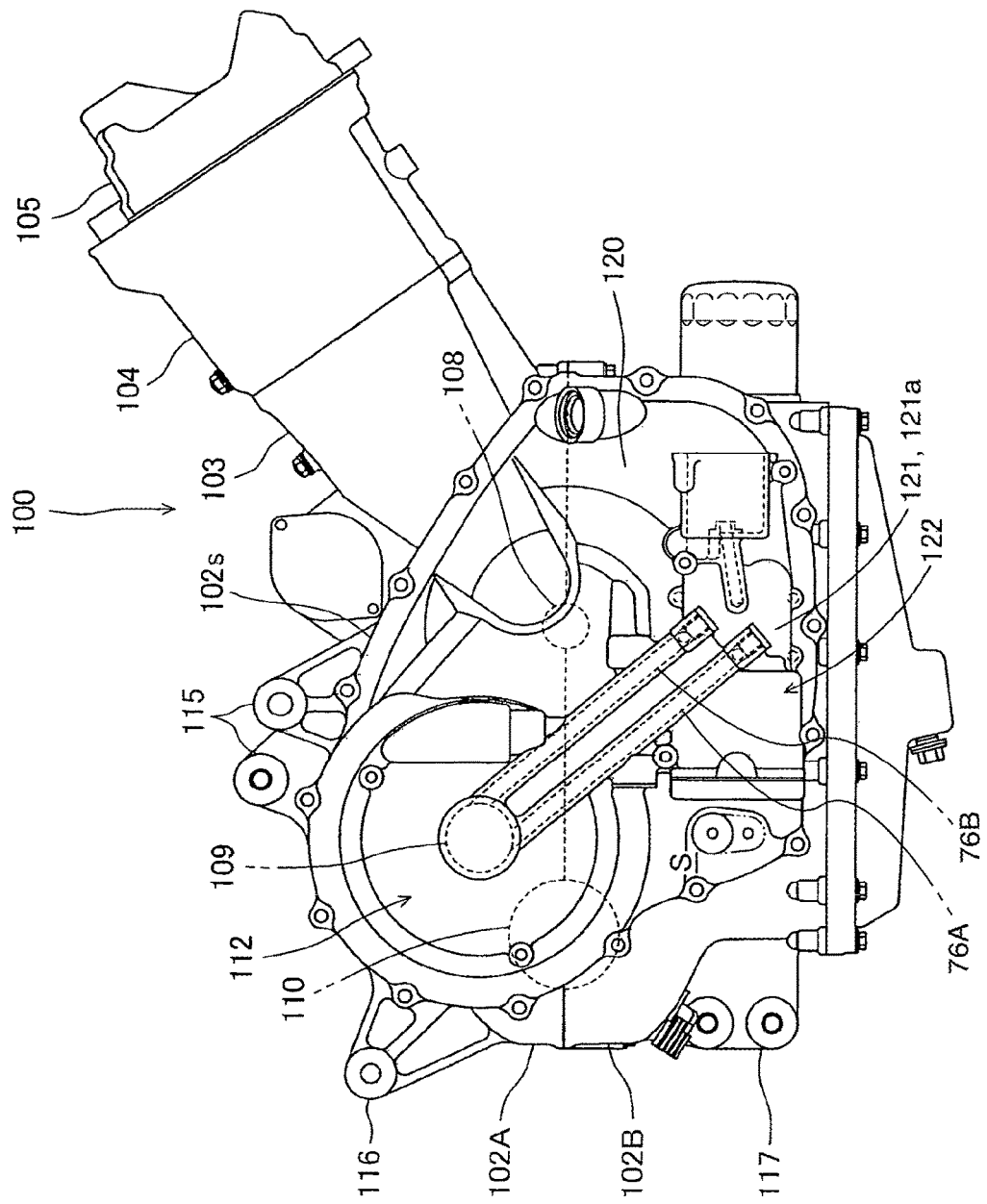
FIG. 14 is a right side view of an internal combustion engine according to a third embodiment of the invention.

Besides, a clutch actuator 122 disposed in an oil sump part 121 formed in an inner surface of a right crankcase cover 120 is located on the lower side of the crankshaft 108 in side view of the internal combustion engine shown in FIG. 14.

A twin clutch 112 is provided at a right end portion of the main shaft 109, and the cutch 112 is covered by the right crankcase cover 120 on the right side thereof, so that the right crankcase cover 120 is bulging to the right side at its portion corresponding to the clutch 112.

The right crankcase cover 120 is formed with an oil sump part 121 in which to dispose the clutch actuator 122 on the lower side of the crankshaft 108 in side view of the internal combustion engine, the oil sump part 121 being so formed as to bulge to the right side.

Thus, of the right crankcase cover 120, the portion corresponding to the clutch 112 which is disposed on the rear upper side of the crankshaft 108 in side view of the internal combustion engine and the oil sump part 121 for the clutch actuator 122 which is disposed on the lower side of the crankshaft 108 are bulging to the right side.

Therefore, a recessed space S is formed on the rear side of the clutch actuator 122 with respect to the right crankcase cover 120 and on the lower side of the clutch 112, and the space S can be used as a foot rest space for the rider.

In this internal combustion engine 100, an upper wall of the upper crankcase 102A forms a slant surface 102s which is facing to a front upper side in positional relationship between the crankshaft 108 and the main shaft 109 located on a rear upper side of the crankshaft 108, and a cylinder block 103, a cylinder head 104, and a cylinder head cover 105 are projected in a forwardly slanted posture from a front portion of the slant surface 102s.

An engine hanger 115 is projected upward from a rear portion of the slant surface 102s between the crankshaft 108 and the main shaft 109.

In addition, engine hangers 116 and 117 are projected rearwards also from rear walls of the upper crankcase 102A and the lower crankcase 102B.

Figure 15:
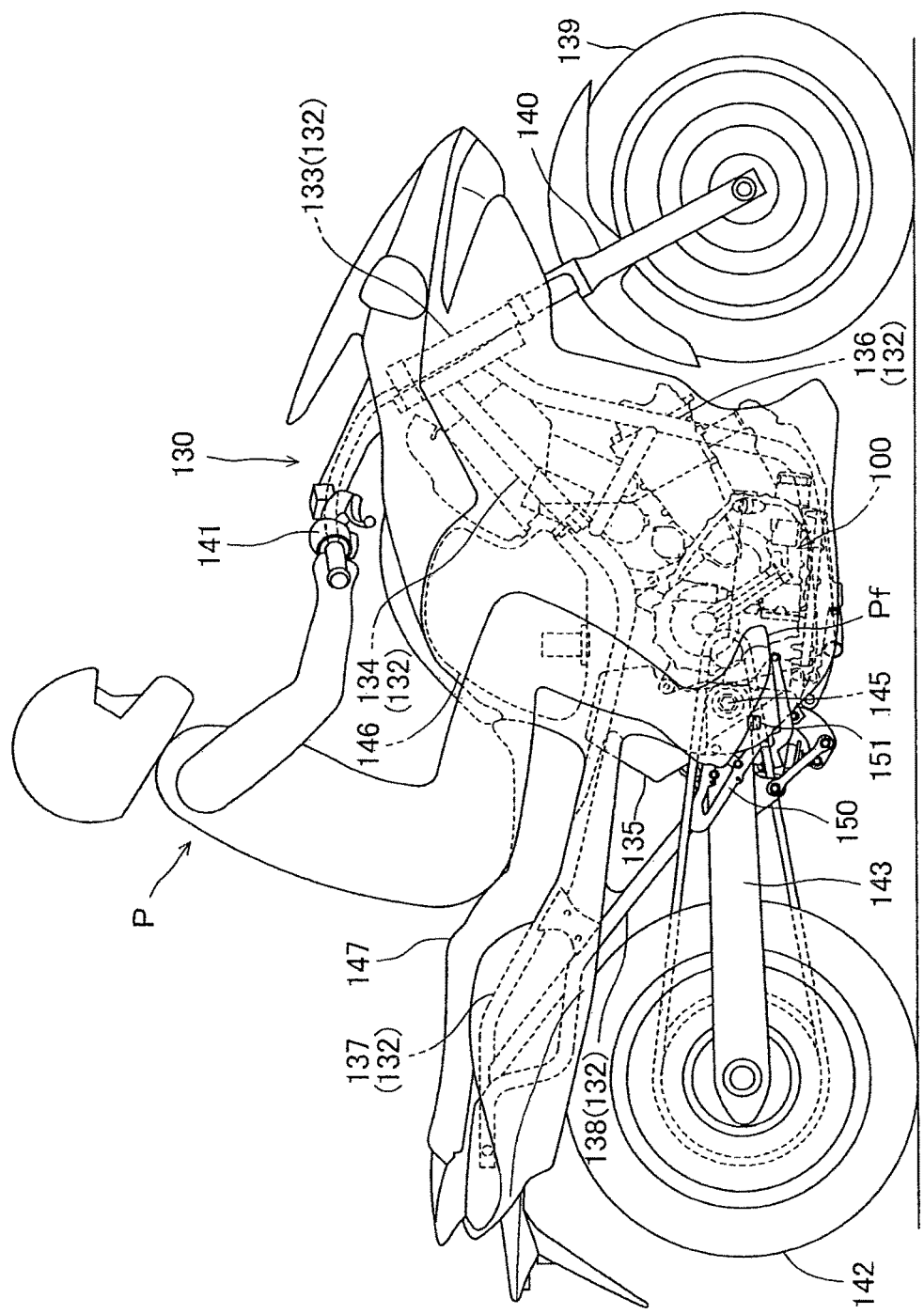
FIG. 15 is a right side view of a motorcycle on which the internal combustion engine is mounted.

In a motorcycle 130 on which this internal combustion engine 100 is mounted, as shown in FIG. 15, a body frame 132 includes a head pipe 133, main frames 134 extending skewly rearwards from the head pipe 133, center frames 135 extending downwards from the rear ends of the main frames 134, a down frame 136 extending downwards from the head pipe 133, seat stays 137 extending rearwards from upper portions of the center frames 135, and mid frames 138 bridgingly arranged between rear portions of the center frames 135 and rear portions of the seat stays 137.

A front fork 140 for supporting a front wheel 139 is steerably supported on the head pipe 133, and a steering handlebar 141 is connected to an upper portion of the front fork 140.

In addition, a rear fork 143 for supporting a rear wheel 142 is vertically swingably supported through a pivot bolt 145 of the center frame 135.

A fuel tank 146 is mounted between the left and right main frames 134, and a tandem type seat 147 on which the driver P and a pillion passenger can be seated is mounted onto the left and right seat stays 137 on the rear side of the fuel tank 146.

The internal combustion engine 100 is disposed in a space surrounded by the main frames 134, the center frames 135 and the down frame 136, on the lower side of the fuel tank 146.

Figure 16:
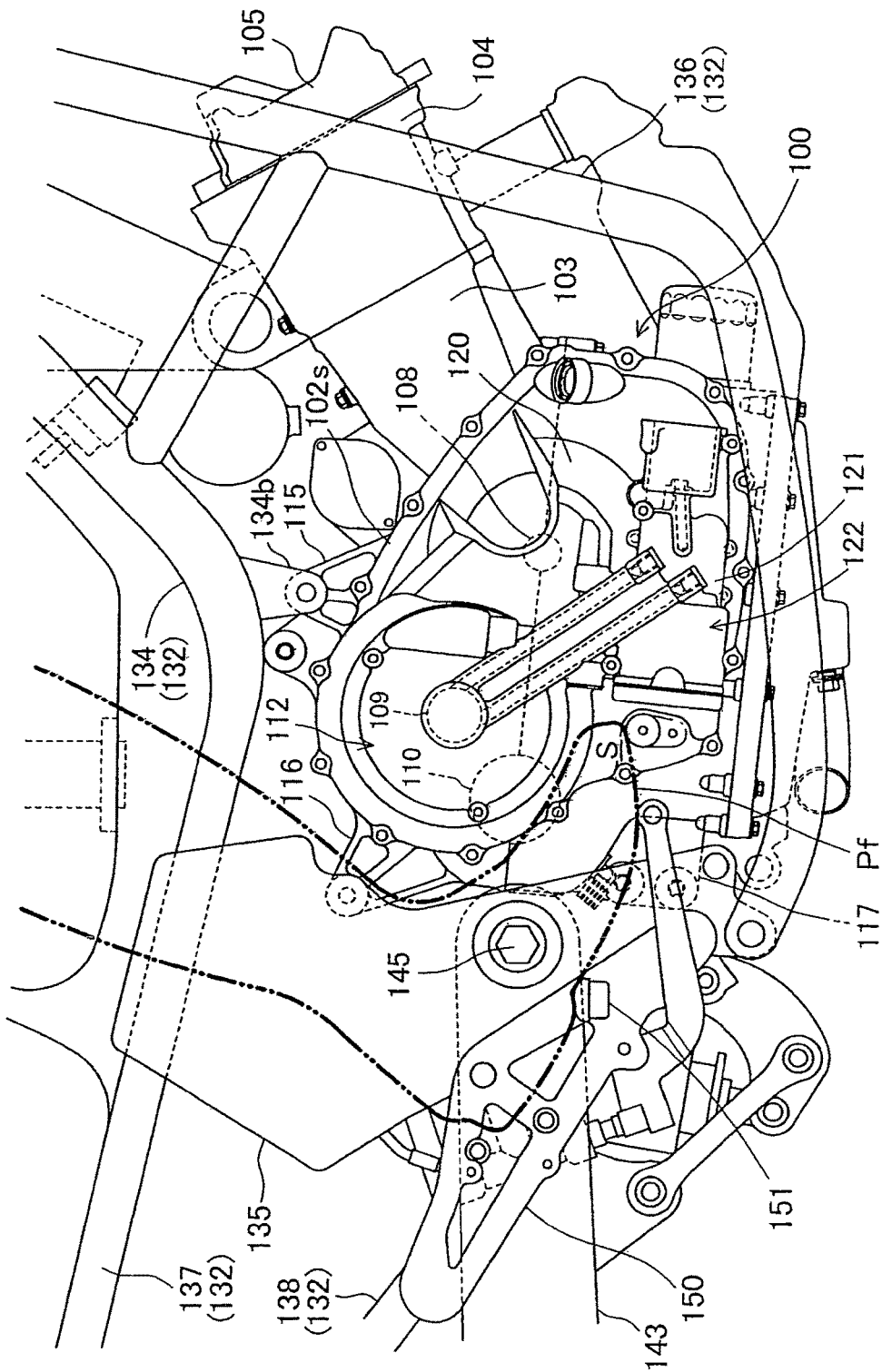
FIG. 16 is an enlarged view of a major part of FIG. 15.

As shown in FIG. 16, an engine hanger 115 projected from the slant surface 102s of the upper wall of the upper crankcase 102A of the internal combustion engine 100 is suspended from the main frames 134 through brackets 134b, and the engine hangers 116 and 117 projecting from the rear walls of the upper crankcase 102A and the lower crankcase 102B are supported by the center frames 135, whereby the internal combustion engine 100 is suspended from the vehicle frame 132.

As shown in FIG. 15, on the right side of the vehicle body, a step holder 150 is provided at a lower portion of the center frame 135 connected to the mid frame 138, and a foot step 151 is projectingly provided on the step holders 150.

Figure 17:
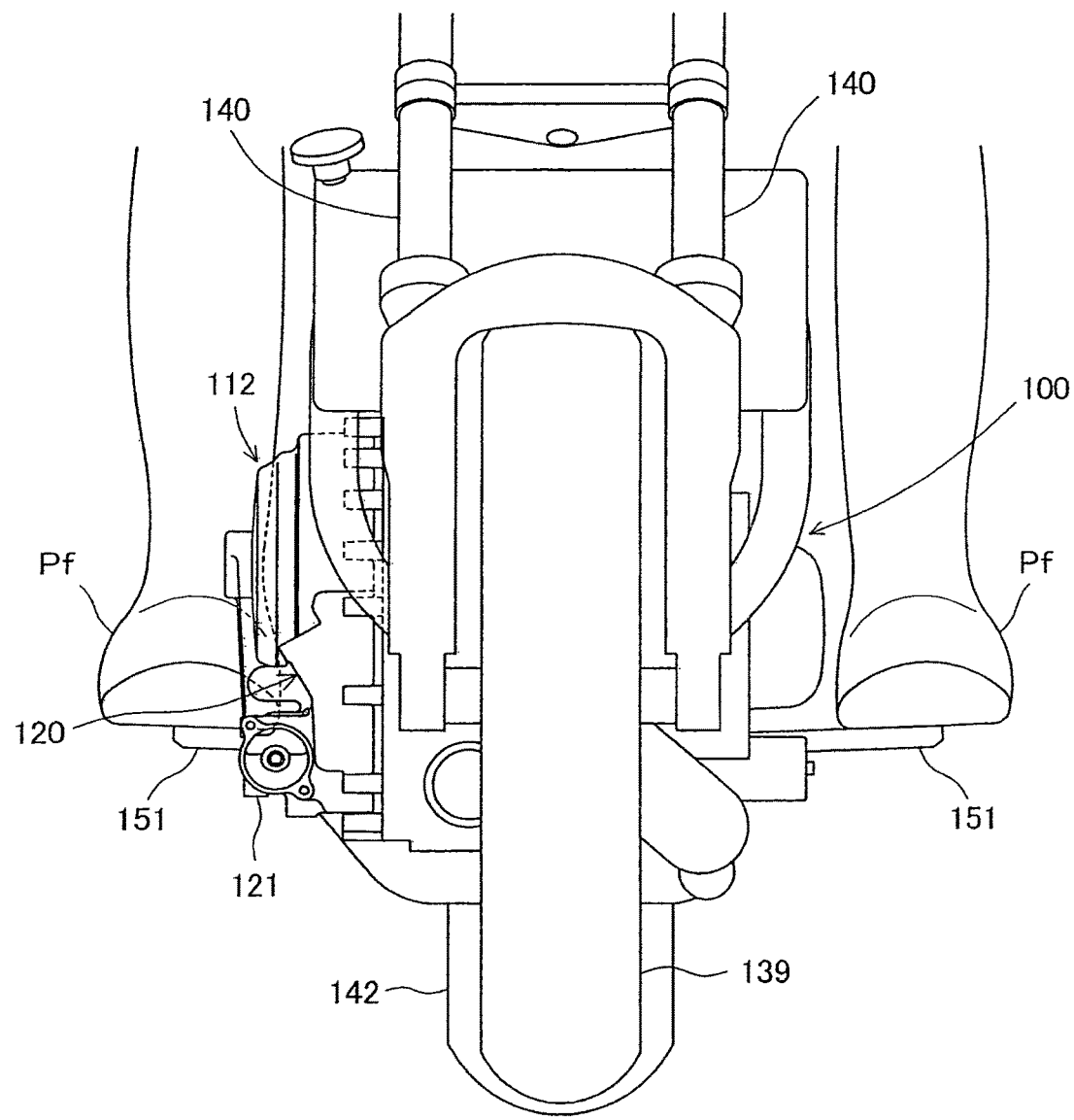
FIG. 17 is a partial front view of the motorcycle.

On the left side of the vehicle body, similarly, a foot step 151 is provided at a position in left-right symmetry with the above (see FIG. 17).

When the driver P is seated on the tandem type seat 147 and put his or her feet Pf on the foot steps 151, as shown in FIGS. 15 and 16, the toe of the foot Pf is accommodated in the recessed space S on the rear side of the clutch actuator 122 at a position on the rear lower side of the crankshaft, namely, on the lower side of the clutch 112.

Of the right crankcase cover 120 covering the right side of the crankcases 102A and 102B of the internal combustion engine 100, the portion corresponding to the clutch 112 and the oil sump part 121 for the clutch actuator 122 are bulging to the right side, and the foot Pf of the driver P is placed in the recessed space S on the lower side of the bulging portion corresponding to the clutch 112 and on the rear side of the oil sump part 121. This ensures that, as shown in FIG. 17, the feet Pf of the driver P can be settled in optimum positions, without letting the feet Pf of the driver P protrude excessively to the left and right outer sides.

As has been described in detail above, in the above-mentioned embodiments, the following effects are obtained.

(1) In FIGS. 5, 6 and 8, the oil sump part 79 for reserving oil is provided in the periphery of the clutch actuators 74, and the clutch actuators 74 are disposed in the oil sump part 79 (see FIGS. 5, 6 and 8). Therefore, the valve opening and closing sounds generated during operation of the clutch actuators 74 can be attenuated, and the sound leaking to the exterior can be reduced.

(2) Since the clutch actuators 74 are mounted to the inside of the oil sump part 79 provided in the crankcase cover 17 and the cover member 78 (see FIG. 6) is so fixed as to cover the oil sump part 79, the oil sump part 79 can be formed in a simple structure.

(3) Since the clutch mechanism is composed of the pair of clutches 21A and 21B (see FIG. 3) and the three oil passages 76A, 76B and 77 are formed to extend from the clutch actuators 74 to the clutch mechanism substantially in parallel to each other (see FIG. 4), the plurality of oil passages can be arranged efficiently. In addition, since the directions of machining are unified, machinability can be enhanced.

(4) Since the oil discharge oil passage 91 provided in the clutch actuator 74 is opening into the oil sump part 79, it is possible to reserve the oil discharged from the clutch actuator 74 and thereby to produce the effect of (1) above. Accordingly, the need for other oil supply means is eliminated, and the number of component parts can be reduced.

(5) The clutch actuator 74 includes the tubular valve case 85 to which a plurality of oil passages are connected, and the valve element 86 slid in the valve case 85 so as to switch over the communicating conditions of the oil passages (see FIG. 7), and the valve element 86 is slid in the valve case 85 by an operation of the clutch actuator 74, whereby the return oil from the clutch is discharged via the discharge oil passage 91. Therefore, the sliding parts can be lubricated utilizing the oil thus discharged.

(6) The supply oil passage 75 for supplying the oil from the oil pump 13 to the valve part including the valve case 85 and the valve element 86 is branched and extended to form the clutch lubricating oil passage 77 and the communicating oil passage 80 (see FIGS. 5 and 11). Thus, the clutch lubricating oil passage 77 is formed by branching and extending the supply oil passage 75, which is easier to carry out than the formation of a clutch lubricating oil passage communicating with other lubricating oil circuit. Consequently, the number of machining steps is reduced.

(7) Since only a single supply oil passage 75 is provided for supplying the oil to the pair of actuators 74A and 74B, the structure is simple.

(8) Design quality is enhanced. In addition, there is the merit that the clutch actuators would not be damaged even upon overturn of the vehicle.

(9) Since the clutch actuators are also cooled by the oil in the oil sump part 79 which is cooled through the wall body of the crankcase cover 17, cooling performance is enhanced.

(10) Since the clutch 112 is disposed on the rear upper side of the crankshaft 108 in side view of the internal combustion engine and the clutch actuator 122 is disposed on the lower side of the crankshaft 108 in side view of the internal combustion engine (see FIG. 16), the recessed space S on the lower side of the clutch 112 and on the rear side of the clutch actuator 122 can be secured as an optimum foot rest position for the driver.

(11) Since the engine hanger 115 is projectingly provided on the slant surface 102s of the upper wall of the upper crankcase 102A (see FIG. 16), it is unnecessary to provide the engine hanger in the state of projecting upward beyond the uppermost part of the crankcase, so that the internal combustion engine 100 can be mounted on the vehicle body in a compact fashion.

Although a specific form of embodiment of the instant invention has been described above and illustrated in the accompanying drawings in order to be more clearly understood, the above description is made by way of example and not as a limitation to the scope of the instant invention. It is contemplated that various modifications apparent to one of ordinary skill in the art could be made without departing from the scope of the invention which is to be determined by the following claims.

We claim:

1. A clutch actuator structure, comprising:
a clutch actuator which controls oil pressure for engaging and disengaging a hydraulic clutch mechanism which transmits a rotational driving force of an engine,
a crankcase cover which covers a side of a crankcase of an engine,
an oil sump which reserves oil, the oil sump being formed in an inner surface of the crankcase cover, the inner surface facing the crankcase,
wherein said clutch actuator is disposed in said oil sump, and
wherein said crankcase cover further comprises
a control oil passage formed within said crankcase cover and extending from said actuator to a pressurization chamber of said hydraulic clutch mechanism.

2. The clutch actuator structure according to claim 1,
wherein said hydraulic clutch mechanism comprises a plurality of clutches, and
wherein a plurality of said control oil passages are formed to extend from said clutch actuator to said hydraulic clutch mechanism substantially in parallel to each other.

3. The clutch actuator structure according to claim 2, wherein said clutch actuator includes an oil discharge hole which opens to said oil sump.

4. The clutch actuator structure according to claim 3, wherein the clutch actuator includes a valve part which comprises
a tubular member to which said plurality of oil passages are connected, and
a sliding member disposed in said tubular member so as to switch between communicating conditions of said plurality of oil passages,
wherein when said sliding member slides relative to said tubular member by an operation of the clutch actuator, return oil from said hydraulic clutch mechanism is discharged from said oil discharge hole of said clutch actuator.

5. The clutch actuator structure according to claim 4, wherein said supply oil passage for supplying oil from said oil pump to said valve part is branched and extended to form said lubricating oil passage.

6. The clutch actuator structure according to claim 1, wherein an oil return hole is disposed above said clutch actuator.

7. The clutch actuator structure according to claim 1,
wherein said clutch actuator is located on a front lower side of said clutch mechanism in side view of the engine.

8. The clutch actuator structure according to claim 7,
wherein said clutch mechanism is disposed on a rear upper side of a crankshaft in side view of the engine, and
wherein said clutch actuator is disposed on a lower side of the crankshaft in side view of the engine.

9. The clutch actuator structure according to claim 8,
wherein a main shaft coaxial with said clutch mechanism is disposed on the rear upper side of the crankshaft,
wherein a slant surface facing toward a front upper side is formed on an upper wall of the crankcase at a position between a position directly above the crankshaft and a position directly above the main shaft, and
wherein an engine hanger is projectingly formed on the slant surface of the upper wall of the crankcase.

10. The clutch actuator structure according to claim 1,
wherein a recessed space is formed in the crankcase cover on a side of the crankcase cover which is opposite to the side which covers the crankcase of the engine,
wherein the recessed space is disposed behind the clutch actuator and below a portion of the crankcase cover covering the pressurization chamber of said clutch mechanism, and
wherein the recessed space is adapted as a foot rest space for a rider of a vehicle in which the clutch actuator structure is disposed.

* * * * *